(12) United States Patent
Amihood et al.

(10) Patent No.: US 11,175,378 B2
(45) Date of Patent: Nov. 16, 2021

(54) SMART-DEVICE-BASED RADAR SYSTEM PERFORMING SYMMETRIC DOPPLER INTERFERENCE MITIGATION

(71) Applicant: Google LLC, Mountain View, CA (US)

(72) Inventors: Patrick M. Amihood, Palo Alto, CA (US); Cody Blair Wortham, San Francisco, CA (US); Jaime Lien, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/911,141

(22) Filed: Jun. 24, 2020

(65) Prior Publication Data

US 2021/0190902 A1 Jun. 24, 2021

Related U.S. Application Data

(63) Continuation of application No. PCT/US2019/067490, filed on Dec. 19, 2019.

(51) Int. Cl.
*G01S 7/02* (2006.01)
*G01S 13/04* (2006.01)
*G01S 13/89* (2006.01)

(52) U.S. Cl.
CPC .............. *G01S 7/023* (2013.01); *G01S 13/04* (2013.01); *G01S 13/89* (2013.01)

(58) Field of Classification Search
CPC . G01S 7/023; G01S 7/292; G01S 7/35; G01S 7/354; G01S 7/40; G01S 7/4004; G01S 7/414; G01S 13/50
See application file for complete search history.

(56) References Cited

U.S. PATENT DOCUMENTS

| 5,113,191 | A  | * | 5/1992  | Knepper  | G01S 13/50 |
|           |    |   |         |          | 342/119    |
| 9,244,159 | B1 | * | 1/2016  | Korchev  | G01S 7/414 |
| 9,607,517 | B2 | * | 3/2017  | Schrabler| G08G 1/16  |
| 9,791,551 | B1 | * | 10/2017 | Eshraghi | G01S 7/038 |
| 10,810,411| B2 | * | 10/2020 | Tai      | G06K 9/6259|

(Continued)

OTHER PUBLICATIONS

"International Search Report and Written Opinion", Application No. PCT/US2019/067490, dated Aug. 18, 2020, 19 pages.

(Continued)

*Primary Examiner* — Peter M Bythrow
(74) *Attorney, Agent, or Firm* — Colby Nipper PLLC

(57) ABSTRACT

Techniques and apparatuses are described that implement a smart-device-based radar system capable of performing symmetric Doppler interference mitigation. The radar system employs symmetric Doppler interference mitigation to filter interference artifacts caused by the vibration of the radar system or the vibration other objects. This filtering operation incorporates the interference artifact within the noise floor, without significantly attenuating reflections from a desired object. This mitigation can filter each radar frame independently without a priori knowledge about the frequency or amplitude of the vibration. The filtering operation is also independent of the Doppler sampling frequency and can handle aliasing. By filtering the interference artifacts, the radar system produces fewer false detections in the presence of vibrations and can detect objects that would otherwise be masked by the interference artifact.

20 Claims, 13 Drawing Sheets

(56) References Cited

U.S. PATENT DOCUMENTS

| | | | |
|---|---|---|---|
| 10,859,675 B2* | 12/2020 | McMahon | G06F 3/017 |
| 10,914,819 B2* | 2/2021 | Longman | G01S 7/352 |
| 2011/0006944 A1* | 1/2011 | Goldman | G01S 13/9054 |
| | | | 342/25 A |
| 2013/0016003 A1* | 1/2013 | Stirling-Gallacher | |
| | | | G01S 13/89 |
| | | | 342/174 |
| 2016/0054438 A1* | 2/2016 | Patole | G01S 7/35 |
| | | | 342/127 |
| 2016/0259037 A1 | 9/2016 | Molchanov et al. | |
| 2017/0097413 A1* | 4/2017 | Gillian | G06F 3/04815 |
| 2018/0081030 A1* | 3/2018 | McMahon | G01S 13/87 |
| 2019/0195728 A1* | 6/2019 | Santra | G01M 5/0091 |
| 2020/0041610 A1* | 2/2020 | Longman | G01S 13/42 |

OTHER PUBLICATIONS

Sharma, "A Clutter Based Motion Estimation and Compensation Technique for a Nonstationary Radar Platform", Apr. 2006, pp. 664-667.

"Written Opinion", Application No. PCT/US2019/067490, dated May 6, 2021, 9 pages.

\* cited by examiner

SMART-DEVICE-BASED RADAR SYSTEM PERFORMING SYMMETRIC DOPPLER INTERFERENCE MITIGATION

PRIORITY APPLICATION

This application claims priority to and is a continuation application of International Application No. PCT/US2019/067490, filed Dec. 19, 2019, the disclosure of which is incorporated herein by reference in its entirety.

BACKGROUND

Radars are useful devices that can detect objects. Relative to other types of sensors, like a camera, a radar can provide improved performance in the presence of different environmental conditions, such as low lighting and fog, or with moving or overlapping objects. Radar can also detect objects through one or more occlusions, such as a purse or a pocket. While radar has many advantages, there are many challenges associated with integrating radar in consumer devices. These challenges include size and layout constraints of the consumer device, interference generated by other components within the consumer device, and motion of the consumer device.

SUMMARY

Techniques and apparatuses are described that implement a smart-device-based radar system capable of performing symmetric Doppler interference mitigation. The radar system employs symmetric Doppler interference mitigation to filter one or more interference artifacts. An interference artifact can occur due to vibration of the radar system or vibration of other objects that are observed by the radar system. Due to the back and forth motion of the vibration, the interference artifact has both a positive and negative range rate. As such, the interference artifact contributes to amplitudes of both positive and negative Doppler bins of a range-Doppler map generated by the radar system. These amplitudes are approximately symmetric across the Doppler spectrum for one or more range bins. If the interference artifact is not filtered, some radar systems may generate a false detection (or a false alarm) based on the interference artifact or be unable to detect a desired object that is obscured by the interference artifact. A false detection or false alarm represents an erroneous detection that does not correspond to an object of interest. In general, an interference artifact refers any type of noise or interference that presents an approximately symmetric amplitude across the Doppler spectrum.

Symmetric Doppler interference mitigation exploits the symmetric amplitude contributions of the interference artifact across the Doppler spectrum to attenuate the interference artifact. This filtering operation incorporates the interference artifact within the noise floor, without significantly attenuating reflections from the desired object. Symmetric Doppler interference mitigation can be performed on each radar frame (e.g., each chirp) without a priori knowledge about the frequency or amplitude of the vibration. In this way, the radar system can filter interference artifacts that are generated from a variety of different types of vibrations. An ability of the symmetric Doppler interference mitigation to attenuate the interference artifact is also independent of the Doppler sampling frequency and whether or not aliasing occurs. By filtering the interference artifacts, the radar system produces fewer false detections in the presence of vibrations and can detect objects that would otherwise be masked by the interference artifact.

Aspects described below include a method performed by a radar system. The method includes transmitting a radar transmit signal and receiving a radar receive signal. The radar receive signal includes an interference artifact and a version of the radar transmit signal that is reflected by at least one object. The method additionally includes generating a range-Doppler map based on the radar receive signal. The interference artifact contributes to amplitudes of both positive and negative Doppler bins of the range-Doppler map for at least one range bin. The method further includes filtering the interference artifact within the range-Doppler map to attenuate the interference artifact and generate a filtered range-Doppler map. The method includes analyzing the filtered range-Doppler map to detect the at least one object.

Aspects described below also include an apparatus comprising a radar system configured to perform any of the described methods.

Aspects described below also include a system with means for performing symmetric Doppler interference mitigation.

BRIEF DESCRIPTION OF THE DRAWINGS

Apparatuses for and techniques implementing a smart-device-based radar system capable of performing symmetric Doppler interference mitigation are described with reference to the following drawings. The same numbers are used throughout the drawings to reference like features and components:

FIG. 2-1 illustrates an example implementation of a radar system as part of a smart device.

FIG. 2-2 illustrates an example location of a radar system relative to other components within a smartphone.

FIG. 3-1 illustrates operation of an example radar system.

FIG. 3-2 illustrates an example radar framing structure.

FIG. 8-1 illustrates an example implementation of an interference mitigation module for performing symmetric Doppler interference mitigation.

FIG. 8-2 illustrates example regions within a range-Doppler map for estimating a noise level for symmetric Doppler interference mitigation.

DETAILED DESCRIPTION

Overview

Figure 1:
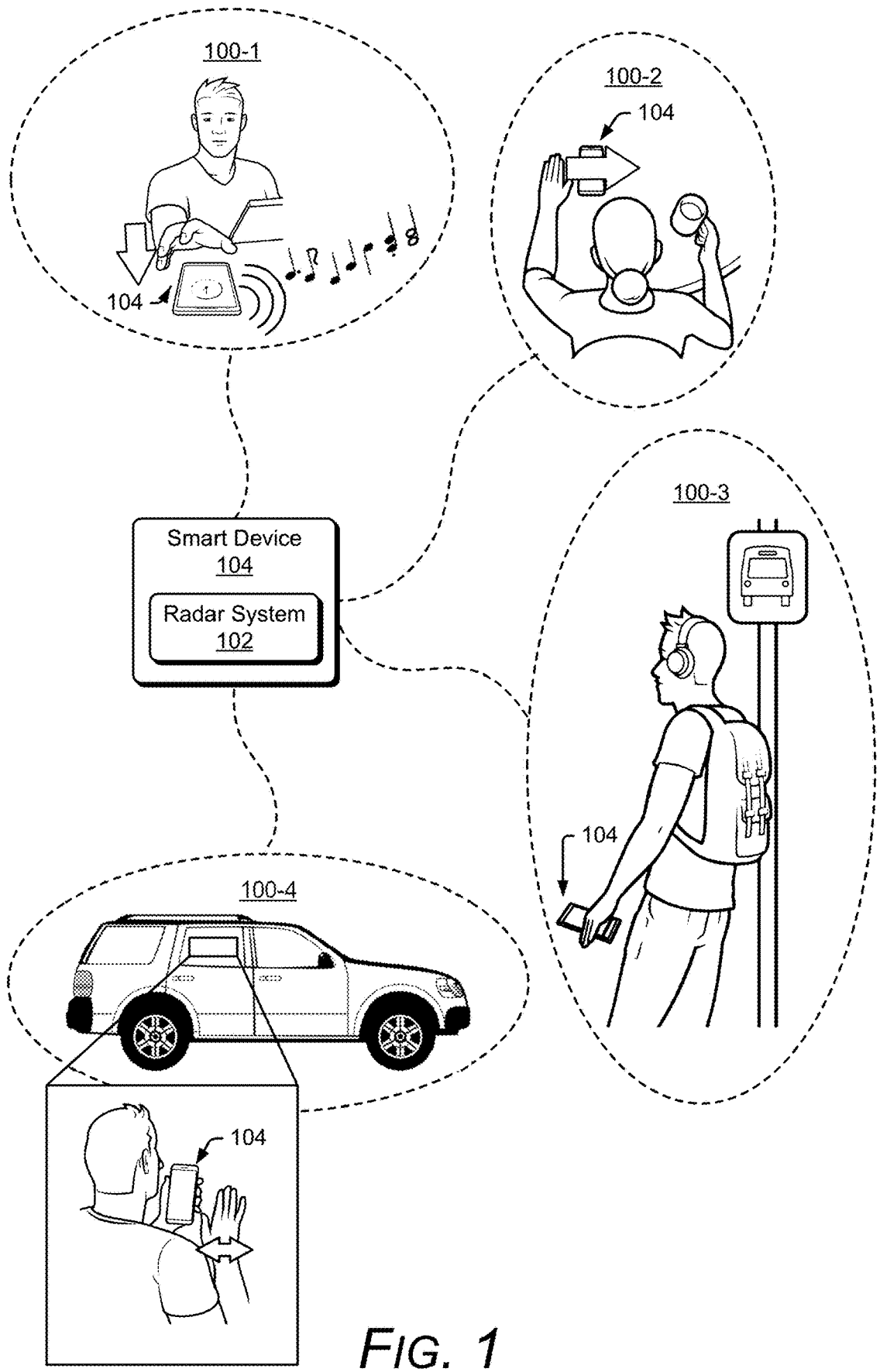
FIG. 1 illustrates example environments in which a smart-device-based radar system capable of performing symmetric Doppler interference mitigation can be implemented.

Integrating a radar system within an electronic device can be challenging. One such challenge involves size or layout constraints of the electronic device, which may limit where the radar can be placed relative to other components within the electronic device. In some cases, an operation of the component causes the radar system to vibrate (e.g., move back and forth across one or more dimensions). A speaker, for instance, can generate an audible sound that causes the radar to vibrate with a frequency that is dependent on the frequency of the audible sound and with an amplitude that is dependent on a volume of the speaker. Additionally or alternatively, the electronic device, which houses the radar system, may vibrate due to external forces. These vibrations can occur as a user walks with the electronic device or rides in a vehicle (e.g., a car, a bus, a train, or a plane).

Due to the vibrations, the radar system observes one or more interference artifacts within a received radar signal. To the radar system, the interference artifact can appear to be one or more moving objects. It can be challenging for the radar system to distinguish between an object of interest (e.g., a desired object) within the external environment and the interference artifact. As such, the radar system may generate one or more false detections based on the interference artifact, which increases the radar system's false-alarm rate and degrades the performance of the radar system. Sometimes the interference artifact can mask the desired object and prevent the radar system from detecting the object.

In other cases, the radar system observes objects that are vibrating. These objects can be internal or external to the electronic device. Sometimes multipath causes the radar system to observe an interference artifact associated with the vibrating object at a range that is farther than the range to the vibrating object. The interference artifact associated with the vibrating object can similarly result in a false detection and mask other desired objects.

Some techniques may try to reduce the occurrence of interference artifacts by isolating the radar system from internal components within the electronic device that cause the radar system to vibrate. However, this may increase cost of the electronic device and increase a footprint of the radar system. In some cases, this may result in the radar system being placed in a sub-optimal location that makes it challenging for the radar system to perform its intended function, such as detecting the user. In other cases, it may not be possible to isolate the radar system from the internal component due to size or layout constraints of the electronic device.

Other techniques may limit a field of view of the radar system to reduce a likelihood of the radar system observing components within the electronic device that vibrate. However, this technique also limits the volume of space in which the radar system can detect a desired object. As such, effective operation of the radar system is limited.

In contrast, this document describes techniques and devices that implement a smart-device-based radar system capable of performing symmetric Doppler interference mitigation. The radar system employs symmetric Doppler interference mitigation to filter one or more interference artifacts. An interference artifact can occur due to vibration of the radar system or vibration of other objects that are observed by the radar system. Due to the back and forth motion of the vibration, the interference artifact has both a positive and negative range rate. As such, the interference artifact contributes to amplitudes of both positive and negative Doppler bins of a range-Doppler map generated by the radar system. These amplitudes are approximately symmetric across the Doppler spectrum for one or more range bins. If the interference artifact is not filtered, some radar systems may generate a false detection (or a false alarm) based on the interference artifact or be unable to detect a desired object that is obscured by the interference artifact. A false detection or false alarm represents an erroneous detection that does not correspond to an object of interest. In general, an interference artifact refers any type of noise or interference that presents an approximately symmetric amplitude across the Doppler spectrum.

Symmetric Doppler interference mitigation exploits the symmetric amplitude contributions of the interference artifact across the Doppler spectrum to attenuate the interference artifact. This filtering operation incorporates the interference artifact within the noise floor, without significantly attenuating reflections from the desired object. Symmetric Doppler interference mitigation can be performed on each radar frame (e.g., each chirp) without a priori knowledge about the frequency or amplitude of the vibration. In this way, the radar system can filter interference artifacts that are generated from a variety of different types of vibrations. An ability of the symmetric Doppler interference mitigation to attenuate the interference artifact is also independent of the Doppler sampling frequency and whether or not aliasing occurs. By filtering the interference artifacts, the radar system produces fewer false detections in the presence of vibrations and can detect objects that would otherwise be masked by the interference artifact.

EXAMPLE ENVIRONMENT

FIG. 1 is an illustration of example environments 100-1 to 100-4 in which techniques using, and an apparatus including, a smart-device-based radar system capable of performing symmetric Doppler interference mitigation may be embodied. In the depicted environments 100-1 to 100-4, a smart device 104 includes a radar system 102 capable of detecting one or more objects (e.g., users) in the presence of one or more interference artifacts. As described above, an interference artifact has an approximately symmetric Doppler response. The smart device 104 is shown to be a smartphone in environments 100-1 to 100-4.

In the environments 100-1 to 100-4, the radar system 102 observes one or more interference artifacts. These interference artifacts can appear due to an operation of a component within the smart device 104 causing the radar system 102 to vibrate, external forces causing the radar system 102 to vibrate, or the radar system 102 observing another vibrating object that is internal or external to the smart device 104. Generally, a vibration refers to a back and forth motion across one or more dimensions. This motion can repeat over time with an amplitude that decays or remains relatively steady.

In the environment 100-1, the smart device 104 produces an audible sound. The audible sound can be a single tone, a ring tone, an alarm bell, or music, for instance. While the audible sound is produced, a user makes a reach gesture, which decreases a distance between the smart device 104 and the user's hand. Although the audible sound causes the radar system 102 to vibrate, the radar system 102 uses symmetric Doppler interference mitigation to filter the interference artifact generated by the audible sound. By filtering the interference artifact, the radar system 102 can detect the reach gesture. Responsive to detecting the reach gesture, the smart device 104 can dynamically adjust a volume of the audible sound based on the distance between the user's hand and the radar system 102.

In some implementations, the radar system can analyze the interference artifact prior to filtering the interference artifact. For example, the radar system 102 can analyze the interference artifact to recognize the type of audible sound produced. This can include identifying the genre of music, recognizing a particular artist, or identifying a title of a song. The radar system 102 can provide information to the smart device 104, which can display the information to the user. In this manner, the radar system 102 can analyze the frequency and amplitude of its vibrations to perform music recognition.

In environment 100-2, the user makes a swipe gesture by moving a hand above the smart device 104 along a horizontal dimension (e.g., from a left side of the smart device 104 to a right side of the smart device 104). While the gesture is performed, the table vibrates due to the user placing their mug on the table. Although this causes the smart device 104, and therefore the radar system 102, to vibrate, the radar system 102 uses symmetric Doppler interference mitigation to filter the resulting interference artifact and detect the swipe gesture. Responsive to detecting the swipe gesture, the smart device 104 displays new content to the user. In environments 100-1 and 100-2, the user performs a gesture using an appendage or body part. Alternatively, the user can perform a gesture using a stylus, a hand-held object, a ring, or any type of material that can reflect radar signals.

The radar system 102 can also recognize other types of gestures or motions not shown in FIG. 1. Example types of gestures include a knob-turning gesture in which a user curls their fingers to grip an imaginary doorknob and rotate their fingers and hand in a clockwise or counter-clockwise fashion to mimic an action of turning the imaginary doorknob. Another example type of gesture includes a spindle-twisting gesture, which a user performs by rubbing a thumb and at least one other finger together.

The gestures can be two-dimensional, such as those used with touch-sensitive displays (e.g., a two-finger pinch, a two-finger spread, or a tap). The gestures can also be three-dimensional, such as many sign-language gestures, e.g., those of American Sign Language (ASL) and other sign languages worldwide. Upon detecting each of these gestures, the smart device 104 can perform an action, such as display new content, move a cursor, activate one or more sensors, open an application, and so forth. In this way, the radar system 102 provides touch-free control of the smart device 104.

In environment 100-3, the user walks with the smart device 104. Although the smart device 104 vibrates with each step the user takes, the radar system 102 uses symmetric Doppler interference mitigation to filter the resulting interference artifact. In this way, the radar system 102 avoids producing false detections based on the interference artifact. Additionally, if a haptic sensor within the smart device 104 activates, the symmetric Doppler interference mitigation can also filter an interference artifact resulting from the haptic sensor to further avoid additional false detections.

In environment 100-4, the user interacts with the smart device 104 while in a moving vehicle. Although rough roads may cause the vehicle to vibrate, the radar system 102 uses symmetric Doppler interference mitigation to filter an interference artifact resulting from vibration of the walls of the vehicle or vibration of the radar system 102 itself. If the smart device 104 includes a piezoelectric touch screen, the radar system 102 can also use symmetric Doppler interference mitigation to filter an interference artifact resulting from the user interacting with the touch screen.

The radar system 102 can perform other types of operations besides gesture recognition or object detection. For example, the radar system 102 can determine one or more characteristics of an object (e.g., location, movement, or composition), generate a three-dimensional map of a surrounding environment for contextual awareness, detect and track multiple users to enable both users to interact with the smart device 104, and perform human vital-sign detection.

Some implementations of the radar system 102 are particularly advantageous as applied in the context of smart devices 104, for which there is a convergence of issues. This can include a need for limitations in a spacing and layout of the radar system 102 and low power. Exemplary overall lateral dimensions of the smart device 104 can be, for example, approximately eight centimeters by approximately fifteen centimeters. Exemplary footprints of the radar system 102 can be even more limited, such as approximately four millimeters by six millimeters with antennas included. Exemplary power consumption of the radar system 102 may be on the order of a few milliwatts to tens of milliwatts (e.g., between approximately two milliwatts and twenty milliwatts). The requirement of such a limited footprint and power consumption for the radar system 102 enables the smart device 104 to include other desirable features in a space-limited package (e.g., a camera sensor, a fingerprint sensor, a display, and so forth). The smart device 104 and the radar system 102 are further described with respect to FIG. 2.

Figures 1, 2:
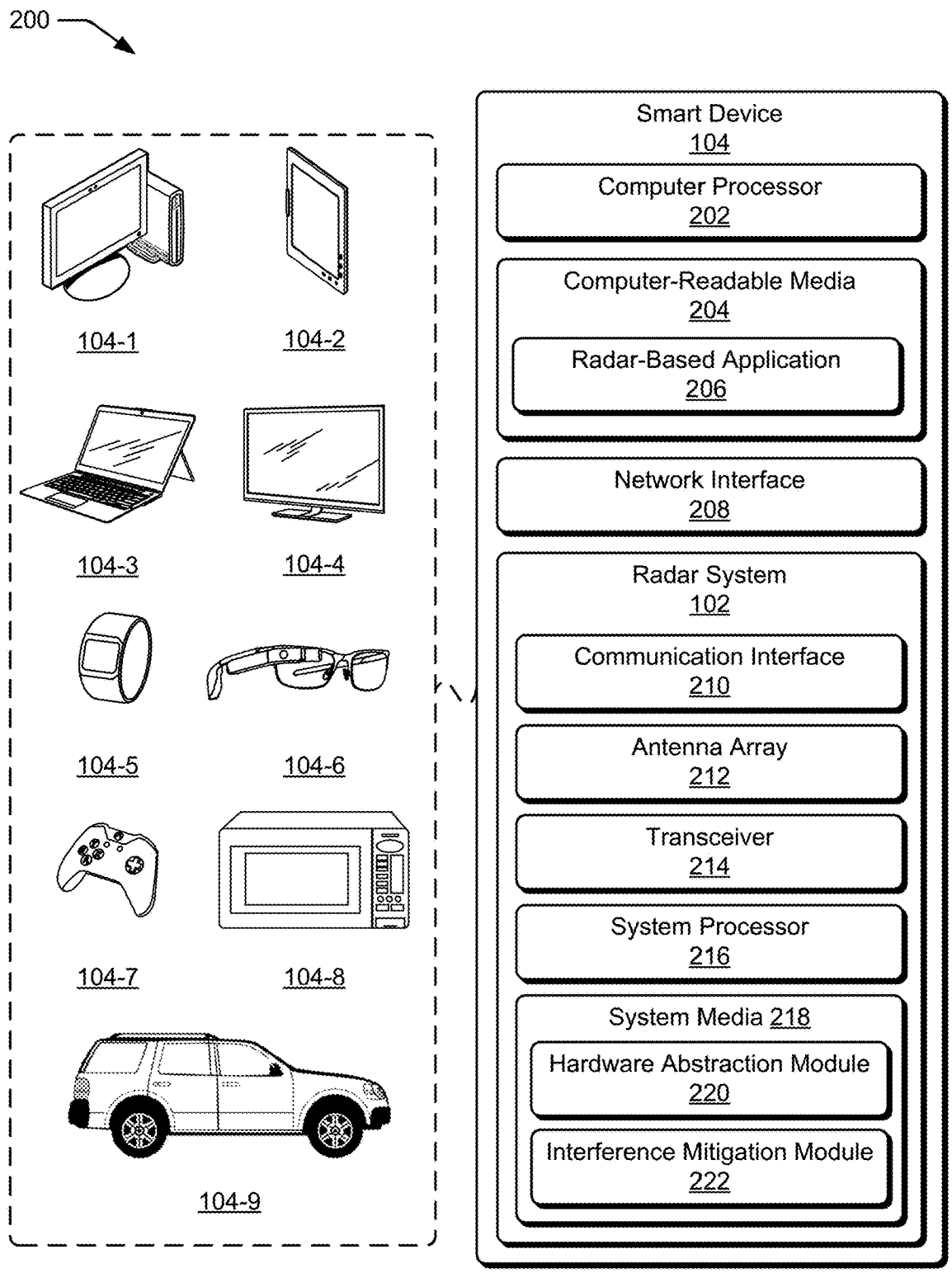
Figure 2:
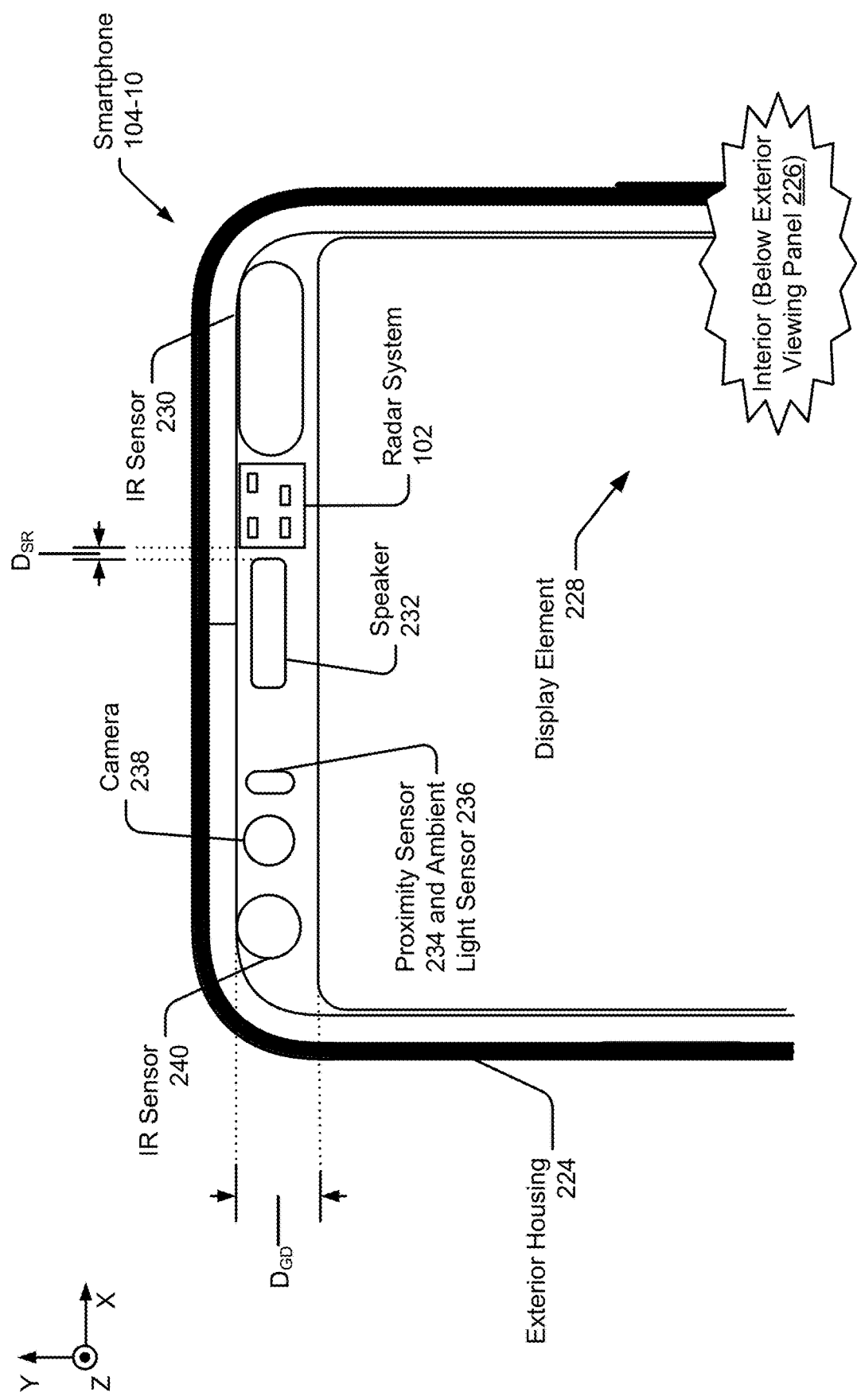

FIG. 2-1 illustrates the radar system 102 as part of the smart device 104. The smart device 104 is illustrated with various non-limiting example devices including a desktop computer 104-1, a tablet 104-2, a laptop 104-3, a television 104-4, a computing watch 104-5, computing glasses 104-6, a gaming system 104-7, a microwave 104-8, and a vehicle 104-9. Other devices may also be used, such as a home service device, a smart speaker, a smart thermostat, a security camera, a baby monitor, a Wi-Fi™ router, a drone, a trackpad, a drawing pad, a netbook, an e-reader, a home-automation and control system, a wall display, and another home appliance. Note that the smart device 104 can be wearable, non-wearable but mobile, or relatively immobile (e.g., desktops and appliances). The radar system 102 can be used as a stand-alone radar system or used with, or embedded within, many different smart devices 104 or peripherals, such as in control panels that control home appliances and systems, in automobiles to control internal functions (e.g., volume, cruise control, or even driving of the car), or as an attachment to a laptop computer to control computing applications on the laptop.

The smart device 104 includes one or more computer processors 202 and computer-readable media 204, which includes memory media and storage media. Applications and/or an operating system (not shown) embodied as computer-readable instructions on the computer-readable media 204 can be executed by the computer processor 202 to provide some of the functionalities described herein. The computer-readable media 204 also includes a radar-based application 206, which uses radar data generated by the radar system 102 to perform a function, such as presence detection, gesture-based touch-free control, collision avoidance for autonomous driving, human vital-sign notification, and so forth.

The smart device 104 can also include a network interface 208 for communicating data over wired, wireless, or optical networks. For example, the network interface 208 may communicate data over a local-area-network (LAN), a wireless local-area-network (WLAN), a personal-area-network (PAN), a wire-area-network (WAN), an intranet, the Internet, a peer-to-peer network, point-to-point network, a mesh network, and the like. The smart device 104 may also include a display (not shown).

The radar system 102 includes a communication interface 210 to transmit the radar data to a remote device, though this need not be used when the radar system 102 is integrated within the smart device 104. In general, the radar data provided by the communication interface 210 is in a format usable by the radar-based application 206.

The radar system 102 also includes at least one antenna array 212 and at least one transceiver 214 to transmit and receive radar signals. The antenna array 212 includes at least one transmit antenna element and at least one receive antenna element. In some situations, the antenna array 212 includes multiple transmit antenna elements to implement a multiple-input multiple-output (MIMO) radar capable of transmitting multiple distinct waveforms at a given time (e.g., a different waveform per transmit antenna element). The antenna elements can be circularly polarized, horizontally polarized, vertically polarized, or a combination thereof.

In some implementations, the antenna array 212 includes two or more receive antenna elements for digital beamforming. The receive antenna elements of the antenna array 212 can be positioned in a one-dimensional shape (e.g., a line) or a two-dimensional shape (e.g., a rectangular arrangement, a triangular arrangement, or an "L" shape arrangement) for implementations that include three or more receive antenna elements. The one-dimensional shape enables the radar system 102 to measure one angular dimension (e.g., an azimuth or an elevation) while the two-dimensional shape enables the radar system 102 to measure two angular dimensions (e.g., to determine both an azimuth angle and an elevation angle of the object 302). An element spacing associated with the receive antenna elements can be less than, greater than, or equal to half a center wavelength of the radar signal.

Using the antenna array 212, the radar system 102 can form beams that are steered or un-steered, wide or narrow, or shaped (e.g., hemisphere, cube, fan, cone, cylinder). The steering and shaping can be achieved through analog beamforming or digital beamforming. The one or more transmitting antenna elements can have, for instance, an un-steered omnidirectional radiation pattern or can produce a wide steerable beam to illuminate a large volume of space. To achieve target angular accuracies and angular resolutions, the receiving antenna elements can be used to generate hundreds or thousands of narrow steered beams with digital beamforming. In this way, the radar system 102 can efficiently monitor an external environment and detect one or more users.

The transceiver 214 includes circuitry and logic for transmitting and receiving radar signals via the antenna array 212. Components of the transceiver 214 can include amplifiers, mixers, switches, analog-to-digital converters, or filters for conditioning the radar signals. The transceiver 214 also includes logic to perform in-phase/quadrature (I/Q) operations, such as modulation or demodulation. A variety of modulations can be used, including linear frequency modulations, triangular frequency modulations, stepped frequency modulations, or phase modulations. Alternatively, the transceiver 214 can produce radar signals having a relatively constant frequency or a single tone. The transceiver 214 can be configured to support continuous-wave or pulsed radar operations.

A frequency spectrum (e.g., range of frequencies) that the transceiver 214 uses to generate the radar signals can encompass frequencies between 1 and 400 gigahertz (GHz), between 4 and 100 GHz, between 1 and 24 GHz, between 2 and 4 GHz, between 57 and 64 GHz, or at approximately 2.4 GHz. In some cases, the frequency spectrum can be divided into multiple sub-spectrums that have similar or different bandwidths. The bandwidths can be on the order of 500 megahertz (MHz), 1 GHz, 2 GHz, and so forth. Different frequency sub-spectrums may include, for example, frequencies between approximately 57 and 59 GHz, 59 and 61 GHz, or 61 and 63 GHz. Although the example frequency sub-spectrums described above are contiguous, other frequency sub-spectrums may not be contiguous. To achieve coherence, multiple frequency sub-spectrums (contiguous or not) that have a same bandwidth may be used by the transceiver 214 to generate multiple radar signals, which are transmitted simultaneously or separated in time. In some situations, multiple contiguous frequency sub-spectrums may be used to transmit a single radar signal, thereby enabling the radar signal to have a wide bandwidth.

The radar system 102 also includes one or more system processors 216 and a system media 218 (e.g., one or more computer-readable storage media). The system media 218 optionally includes a hardware-abstraction module 220. The system media 218 also includes an interference mitigation module 222. The hardware-abstraction module 220 and the interference mitigation module 222 can be implemented using hardware, software, firmware, or a combination thereof. In this example, the system processor 216 implements the hardware-abstraction module 220 and the interference mitigation module 222. Together, the hardware-abstraction module 220 and the interference mitigation module 222 enable the system processor 216 to process responses from the receive antenna elements in the antenna array 212 to detect a user, determine a position of the object, and/or recognize a gesture performed by the user.

In an alternative implementation (not shown), the hardware-abstraction module 220 and the interference mitigation module 222 are included within the computer-readable media 204 and implemented by the computer processor 202. This enables the radar system 102 to provide the smart device 104 raw data via the communication interface 210 such that the computer processor 202 can process the raw data for the radar-based application 206.

The hardware-abstraction module 220 transforms raw data provided by the transceiver 214 into hardware-agnostic radar data, which can be processed by the interference mitigation module 222. In particular, the hardware-abstraction module 220 conforms complex radar data from a variety of different types of radar signals to an expected input of the interference mitigation module 222. This enables the interference mitigation module 222 to process different types of radar signals received by the radar system 102, including those that utilize different modulations schemes for frequency-modulated continuous-wave radar, phase-modulated spread spectrum radar, or impulse radar. The hardware-abstraction module 220 can also normalize complex radar data from radar signals with different center frequencies, bandwidths, transmit power levels, or pulsewidths.

Additionally, the hardware-abstraction module 220 conforms complex radar data generated using different hardware architectures. Different hardware architectures can include different antenna arrays 212 positioned on different surfaces of the smart device 104 or different sets of antenna elements within an antenna array 212. By using the hardware-abstraction module 220, the interference mitigation module 222 can process complex radar data generated by different sets of antenna elements with different gains, different sets of antenna elements of various quantities, or different sets of antenna elements with different antenna element spacings.

By using the hardware-abstraction module 220, the interference mitigation module 222 can operate in radar systems 102 with different limitations that affect the available radar modulation schemes, transmission parameters, or types of hardware architectures. The hardware-abstraction module 220 is further described with respect to FIG. 6.

The interference mitigation module 222 filters the hardware-agnostic radar data to attenuate one or more interference artifacts resulting from vibration of the radar system 102 or vibration of other objects detected by the radar system 102. Due to the back and forth motion of the vibration, the interference artifact has both a positive and negative range rate. As such, the interference artifact contributes to amplitudes across both positive and negative Doppler bins of a range-Doppler map generated by the radar system. In contrast, most desired objects contribute to amplitudes across either positive or negative Doppler bins. In other words, the amplitudes resulting from the interference artifact are approximately symmetric across the Doppler bins, whereas the amplitudes resulting from the desired object are one-sided and not symmetrical. The interference mitigation module 222 exploits this difference to attenuate the interference artifact without significantly attenuating the desired object. In some cases, the interference mitigation module 222 can also analyze and adjust phase information within the range-Doppler map to mitigate the effects of the interference artifact. The interference mitigation module 222 is further described with respect to FIG. 8-1.

The interference mitigation module 222 produces filtered radar data, which can be further analyzed by the system processor 216. For example, the system processor 216 can process the filtered radar data to generate radar-application data for the radar-based application 206. Example types of radar-application data include a position of a user, movement of the user, a type of gesture performed by the user, a measured vital-sign of the user, a collision alert, or characteristics of an object.

FIG. 2-2 illustrates an example location of the radar system 102 relative to other components within the smart device 104. In this example, the smart device 104 is shown to be a smartphone 104-10. An exterior of the smartphone 104-10 includes an exterior housing 224 and an exterior viewing panel 226. As an example, the exterior housing 224 has a vertical height of approximately 147 millimeters (mm), a horizontal length of approximately 69 mm, and a width of approximately 8 mm. The exterior housing 224 can be composed of metal material, for instance.

The exterior viewing panel 226 forms an exterior face of the smartphone 104-10 and has a vertical height of approximately 139 mm and a horizontal length of approximately 61 mm. The exterior viewing panel 226 includes cut-outs for various components that are positioned within an interior of the smartphone 104-10 (e.g., positioned beneath the exterior viewing panel 226). These components are further described below.

The exterior viewing panel 226 can be formed using various types of glass or plastics that are found within display screens. In some implementations, the exterior viewing panel 226 has a dielectric constant (e.g., a relative permittivity) between approximately four and ten, which attenuates or distorts radar signals. As such, the exterior viewing panel 226 is opaque or semi-transparent to a radar signal and can cause a portion of a transmitted or received radar signal to be reflected.

At least a portion of the radar system 102, such as an integrated circuit that includes the antenna array 212 and the transceiver 214, is positioned beneath the exterior viewing panel 226 and near an edge of the smartphone 104-10. As an example, the integrated circuit has a vertical height of approximately 5 mm, a horizontal length of approximately 6.5 mm, and a thickness of approximately 0.85 mm (within +/−0.1 mm along each dimension). These dimensions enable the integrated circuit to fit between the exterior housing 224 and a display element 228. The vertical height of the integrated circuit can be similar to other components that are positioned near the edge of the smartphone 104-10 so as to avoid reducing a size of the display element 228.

In this example implementation, the antenna array 212 is oriented towards (e.g., faces) the exterior viewing panel 226. As such, the integrated circuit radiates through the exterior viewing panel 226 (e.g., transmits and receives the radar signals that propagate through the exterior viewing panel 226). If the exterior viewing panel 226 behaves as an attenuator, the radar system 102 can adjust a frequency or a steering angle of a transmitted radar signal to mitigate the effects of the attenuator instead of increasing transmit power. As such, the radar system 102 can realize enhanced accuracy and longer ranges for detecting the user without increasing power consumption.

The display element 228 displays images that are viewed through the exterior viewing panel 226. As shown, the antenna array 212 of the radar system 102 is oriented towards (e.g., faces) a same direction as the display element 228 such that the radar integrated circuit 238 transmits radar signals towards a user that is looking at the display element 228.

In this example, the integrated circuit transmits and receives radar signals with frequencies between approximately 57 and 64 GHz. This mitigates electromagnetic interference with a wireless communication system of the smartphone 104-10, which uses frequencies below 20 GHz, for instance. Transmitting and receiving radar signals with millimeter wavelengths further enables the integrated circuit to realize the above footprint.

A depicted interior of the smartphone 104-10 includes the integrated circuit of the radar system 102, the display element 228, an infrared sensor 230, a speaker 232, a proximity sensor 234, an ambient light sensor 236, a camera 238, and another infrared sensor 240. The integrated circuit of the radar system 102, the infrared sensor 230, the speaker 232, the proximity sensor 234, the ambient light sensor 236, the camera 238, and the infrared sensor 240 are positioned beneath an upper portion of the exterior viewing panel 226. The display element 228 is positioned beneath the lower portion of the exterior viewing panel 226. In this example, a distance between a top edge of the display element 228 and a top edge of the exterior viewing panel 226 ($D_{GD}$) is approximately 6.2 mm.

The infrared sensors 230 and 240 can be used for facial recognition. To conserve power, the infrared sensors 230 and 240 operate in an off-state when not in use. However, a warm-up sequence associated with transitioning the infrared sensors 230 and 240 from the off-state to an on-state can require a significant amount of time, such as a half-second or more. This can cause a delay in execution of the facial recognition. To reduce this time delay, the radar system 102 proactively detects the user reaching towards or approaching the smartphone 104-10 and initiates the warm-up sequence prior to the user touching the smartphone 104-10. As such, the infrared sensors 230 and 240 can be in the on-state sooner and reduce a time the user waits for the facial recognition to complete.

In this example, the integrated circuit of the radar system 102 is positioned between the infrared sensor 230 and the speaker 232. A distance between the integrated circuit and the speaker 232 ($D_{SR}$) is approximately 0.93 mm or less. As such, the radar system 102 is within close proximity to the speaker 232 and can vibrate while the speaker 232 produces audible sounds. By using symmetric Doppler interference mitigation, the radar system 102 can operate while the speaker 232 is producing the audible sounds without increasing the false-alarm rate.

Figures 1, 3:
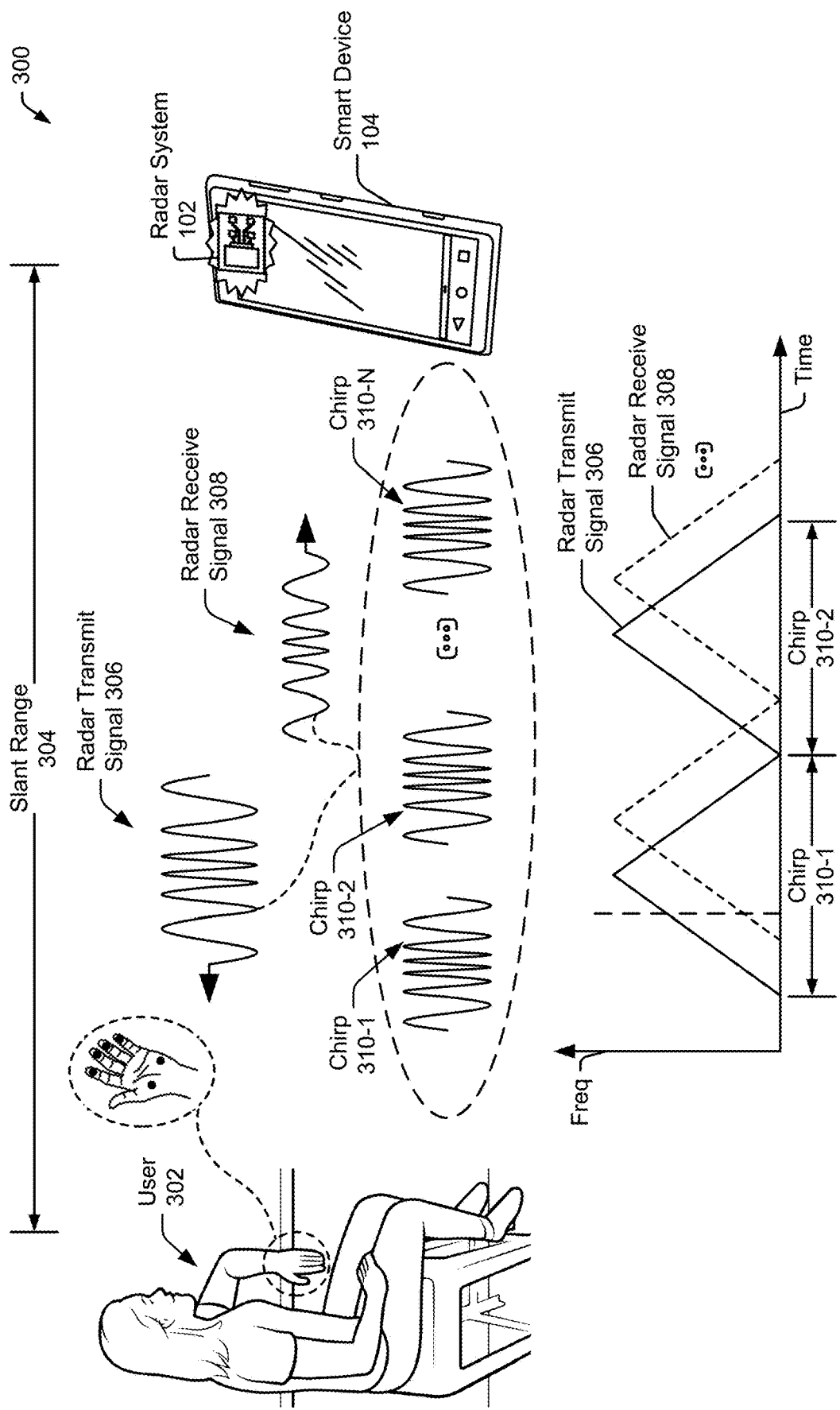
Figures 2, 3:
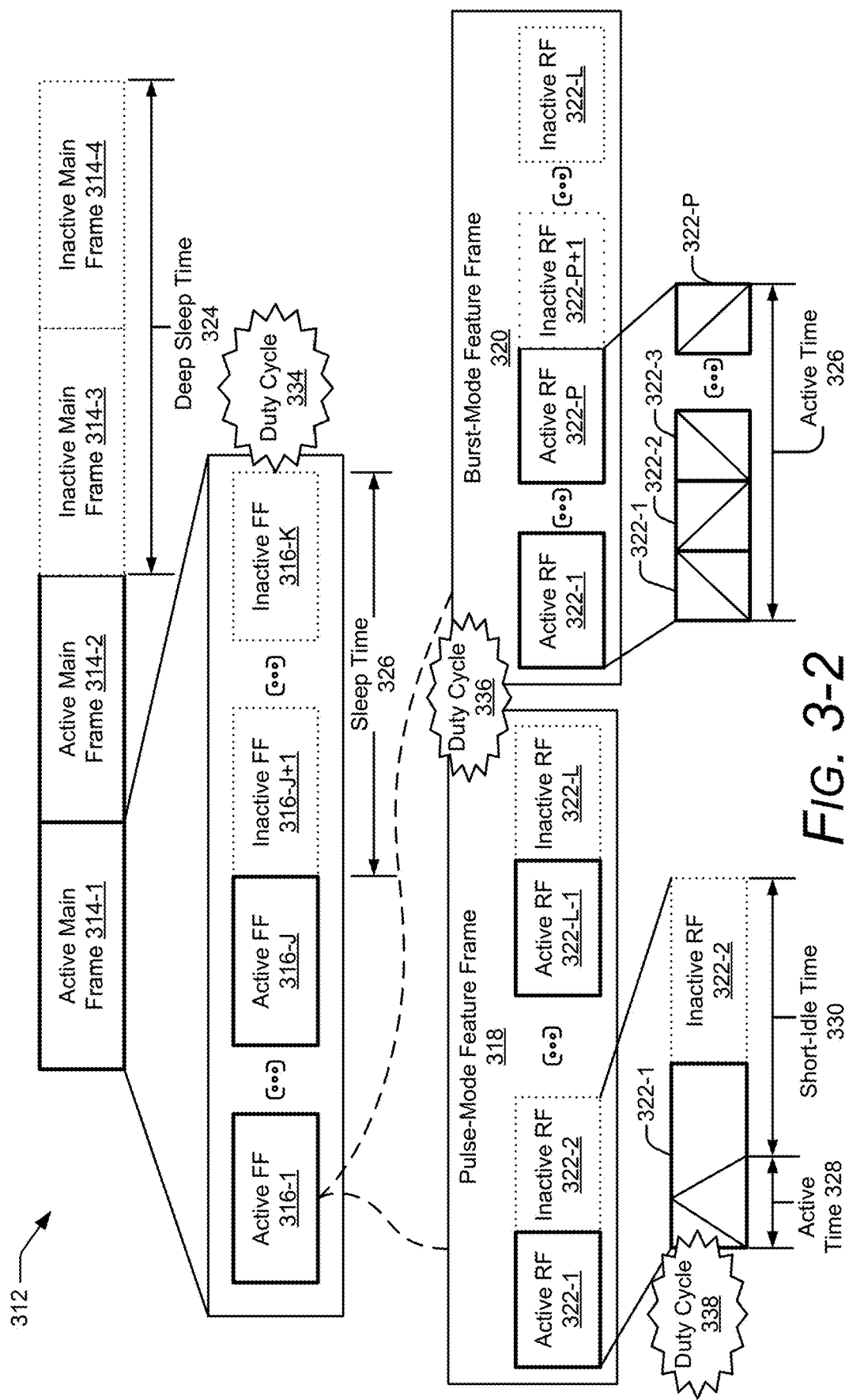

FIG. 3-1 illustrates an example operation of the radar system 102. In the depicted configuration, the radar system 102 is implemented as a frequency-modulated continuous-wave radar. However, other types of radar architectures can be implemented, as described above with respect to FIG. 2-1. In environment 300, a user 302 is located at a particular slant range 304 from the radar system 102. To detect the user 302, the radar system 102 transmits a radar transmit signal 306. At least a portion of the radar transmit signal 306 is reflected by the user 302. This reflected portion represents a radar receive signal 308. The radar system 102 receives the radar receive signal 308 and processes the radar receive signal 308 to extract data for the radar-based application 206. As depicted, an amplitude of the radar receive signal 308 is smaller than an amplitude of the radar transmit signal 306 due to losses incurred during propagation and reflection.

The radar transmit signal 306 includes a sequence of chirps 310-1 to 310-N, where N represents a positive integer greater than one. The radar system 102 can transmit the chirps 310-1 to 310-N in a continuous burst or transmit the chirps 310-1 to 310-N as time-separated pulses, as further described with respect to FIG. 3-2. A duration of each chirp 310-1 to 310-N can be on the order of tens or thousands of microseconds (e.g., between approximately 30 microseconds (μs) and 5 milliseconds (ms)), for instance.

Individual frequencies of the chirps 310-1 to 310-N can increase or decrease over time. In the depicted example, the radar system 102 employs a two-slope cycle (e.g., triangular frequency modulation) to linearly increase and linearly decrease the frequencies of the chirps 310-1 to 310-N over time. The two-slope cycle enables the radar system 102 to measure the Doppler frequency shift caused by motion of the user 302. In general, transmission characteristics of the chirps 310-1 to 310-N (e.g., bandwidth, center frequency, duration, and transmit power) can be tailored to achieve a particular detection range, range resolution, or doppler sensitivity for detecting one or more characteristics the user 302 or one or more actions performed by the user 302.

At the radar system 102, the radar receive signal 308 represents a delayed version of the radar transmit signal 306. The amount of delay is proportional to the slant range 304 (e.g., distance) from the antenna array 212 of the radar system 102 to the user 302. In particular, this delay represents a summation of a time it takes for the radar transmit signal 306 to propagate from the radar system 102 to the user 302 and a time it takes for the radar receive signal 308 to propagate from the user 302 to the radar system 102. If the user 302 and/or the radar system 102 is moving, the radar receive signal 308 is shifted in frequency relative to the radar transmit signal 306 due to the Doppler effect. In other words, characteristics of the radar receive signal 308 are dependent upon motion of the hand and/or motion of the radar system 102. Similar to the radar transmit signal 306, the radar receive signal 308 is composed of one or more of the chirps 310-1 to 310-N.

The multiple chirps 310-1 to 310-N enable the radar system 102 to make multiple observations of the user 302 over a predetermined time period. A radar framing structure determines a timing of the chirps 310-1 to 310-N, as further described with respect to FIG. 3-2.

FIG. 3-2 illustrates an example radar framing structure 312 for symmetric Doppler interference mitigation. In the depicted configuration, the radar framing structure 312 includes three different types of frames. At a top level, the radar framing structure 312 includes a sequence of main frames 314, which can be in the active state or the inactive state. Generally speaking, the active state consumes a larger amount of power relative to the inactive state. At an intermediate level, the radar framing structure 312 includes a sequence of feature frames 316, which can similarly be in the active state or the inactive state. Different types of feature frames 316 include a pulse-mode feature frame 318 (shown at the bottom-left of FIG. 3-2) and a burst-mode feature frame 320 (shown at the bottom-right of FIG. 3-2). At a low level, the radar framing structure 312 includes a sequence of radar frames (RF) 322, which can also be in the active state or the inactive state.

The radar system 102 transmits and receives a radar signal during an active radar frame 322. In some situations, the radar frames 322 are individually analyzed for basic radar operations, such as search and track, clutter map generation, user location determination, and so forth. Radar data collected during each active radar frame 322 can be saved to a buffer after completion of the radar frame 322 or provided directly to the system processor 216 of FIG. 2.

The radar system 102 analyzes the radar data across multiple radar frames 322 (e.g., across a group of radar frames 322 associated with an active feature frame 316) to identify a particular feature. Example types of features include a particular type of motion, a motion associated with a particular appendage (e.g., a hand or individual fingers), and a feature associated with different portions of the gesture. To recognize a gesture performed by the user 302 during an active main frame 314, the radar system 102 analyzes the radar data associated with one or more active feature frames 316.

A duration of the main frame 314 may be on the order of milliseconds or seconds (e.g., between approximately 10 ms and 10 seconds (s)). After active main frames 314-1 and 314-2 occur, the radar system 102 is inactive, as shown by inactive main frames 314-3 and 314-4. A duration of the inactive main frames 314-3 and 314-4 is characterized by a deep sleep time 324, which may be on the order of tens of milliseconds or more (e.g., greater than 50 ms). In an example implementation, the radar system 102 turns off all of the active components (e.g., an amplifier, an active filter, a voltage-controlled oscillator (VCO), a voltage-controlled buffer, a multiplexer, an analog-to-digital converter, a phase-lock loop (PLL) or a crystal oscillator) within the transceiver 214 to conserve power during the deep sleep time 324.

In the depicted radar framing structure 312, each main frame 314 includes K feature frames 316, where K is a positive integer. If the main frame 314 is in the inactive state, all of the feature frames 316 associated with that main frame 314 are also in the inactive state. In contrast, an active main frame 314 includes J active feature frames 316 and K-J inactive feature frames 316, where J is a positive integer that is less than or equal to K. A quantity of feature frames 316 can be adjusted based on a complexity of the environment or a complexity of a gesture. For example, a main frame 314 can include a few to a hundred feature frames 316 (e.g., K may equal 2, 10, 30, 60, or 100). A duration of each feature frame 316 may be on the order of milliseconds (e.g., between approximately 1 ms and 50 ms).

To conserve power, the active feature frames 316-1 to 316-J occur prior to the inactive feature frames 316-(J+1) to 316-K. A duration of the inactive feature frames 316-(J+1) to 316-K is characterized by a sleep time 326. In this way, the inactive feature frames 316-(J+1) to 316-K are consecutively executed such that the radar system 102 can be in a powered-down state for a longer duration relative to other techniques that may interleave the inactive feature frames 316-(J+1) to 316-K with the active feature frames 316-1 to 316-J. Generally speaking, increasing a duration of the sleep time 326 enables the radar system 102 to turn off components within the transceiver 214 that require longer start-up times.

Each feature frame 316 includes L radar frames 322, where L is a positive integer that may or may not be equal to J or K. In some implementations, a quantity of radar frames 322 may vary across different feature frames 316 and may comprise a few frames or hundreds of frames (e.g., L may equal 5, 15, 30, 100, or 500). A duration of a radar frame 322 may be on the order of tens or thousands of microseconds (e.g., between approximately 30 µs and 5 ms). The radar frames 322 within a particular feature frame 316 can be customized for a predetermined detection range, range resolution, or doppler sensitivity, which facilitates detection of a particular feature or gesture. For example, the radar frames 322 may utilize a particular type of modulation, bandwidth, frequency, transmit power, or timing. If the feature frame 316 is in the inactive state, all of the radar frames 322 associated with that feature frame 316 are also in the inactive state.

The pulse-mode feature frame 318 and the burst-mode feature frame 320 include different sequences of radar frames 322. Generally speaking, the radar frames 322 within an active pulse-mode feature frame 318 transmit pulses that are separated in time by a predetermined amount. This disperses observations over time, which can make it easier for the radar system 102 to recognize a gesture due to larger changes in the observed chirps 310-1 to 310-N within the pulse-mode feature frame 318 relative to the burst-mode feature frame 320. In contrast, the radar frames 322 within an active burst-mode feature frame 320 transmit pulses continuously across a portion of the burst-mode feature frame 320 (e.g., the pulses are not separated by a predetermined amount of time). This enables an active-burst-mode feature frame 320 to consume less power than the pulse-mode feature frame 318 by turning off a larger quantity of components, including those with longer start-up times, as further described below.

Within each active pulse-mode feature frame 318, the sequence of radar frames 322 alternates between the active state and the inactive state. Each active radar frame 322 transmits a chirp 310 (e.g., a pulse), which is illustrated by a triangle. A duration of the chirp 310 is characterized by an active time 328. During the active time 328, components within the transceiver 214 are powered-on. During a short-idle time 330, which includes the remaining time within the active radar frame 322 and a duration of the following inactive radar frame 322, the radar system 102 conserves power by turning off one or more active components within the transceiver 214 that have a start-up time within a duration of the short-idle time 330.

An active burst-mode feature frame 320 includes P active radar frames 322 and L-P inactive radar frames 322, where P is a positive integer that is less than or equal to L. To conserve power, the active radar frames 322-1 to 322-P occur prior to the inactive radar frames 322-(P+1) to 322-L. A duration of the inactive radar frames 322-(P+1) to 322-L is characterized by a long-idle time 332. By grouping the inactive radar frames 322-(P+1) to 322-L together, the radar system 102 can be in a powered-down state for a longer duration relative to the short-idle time 330 that occurs during the pulse-mode feature frame 318. Additionally, the radar system 102 can turn off additional components within the transceiver 214 that have start-up times that are longer than the short-idle time 330 and shorter than the long-idle time 332.

Each active radar frame 322 within an active burst-mode feature frame 320 transmits a portion of the chirp 310. In this example, the active radar frames 322-1 to 322-P alternate between transmitting a portion of the chirp 310 that increases in frequency and a portion of the chirp 310 that decreases in frequency.

The radar framing structure 312 enables power to be conserved through adjustable duty cycles within each frame type. A first duty cycle 334 is based on a quantity of active feature frames 316 (J) relative to a total quantity of feature frames 316 (K). A second duty cycle 336 is based on a quantity of active radar frames 322 (e.g., L/2 or P) relative to a total quantity of radar frames 322 (L). A third duty cycle 338 is based on a duration of the chirp 310 relative to a duration of a radar frame 322.

Consider an example radar framing structure 312 for a power state that consumes approximately 2 milliwatts (mW) of power and has a main-frame update rate between approximately 1 and 4 hertz (Hz). In this example, the radar framing structure 312 includes a main frame 314 with a duration between approximately 250 ms and 1 second. The main frame 314 includes thirty-one pulse-mode feature frames 318 (e.g., K is equal to 31). One of the thirty-one pulse-mode feature frames 318 is in the active state. This results in the duty cycle 334 being approximately equal to 3.2%. A duration of each pulse-mode feature frame 318 is between approximately 8 and 32 ms. Each pulse-mode feature frame 318 is composed of eight radar frames 322 (e.g., L is equal to 8). Within the active pulse-mode feature frame 318, all eight radar frames 322 are in the active state. This results in the duty cycle 336 being equal to 100%. A duration of each radar frame 322 is between approximately 1 and 4 ms. An active time 328 within each of the active radar frames 322 is between approximately 32 and 128 µs. As such, the resulting duty cycle 338 is approximately 3.2%. This example radar framing structure 312 has been found to yield good performance results. These good performance results are in terms of good symmetric Doppler interference mitigation, gesture recognition, and presence detection while also yielding good power efficiency results in the application context of a handheld smartphone in a low-power state. Generation of the radar transmit signal 306 (of FIG. 3-1) and the processing of the radar receive signal 308 (of FIG. 3-1) are further described with respect to FIG. 4.

Figure 4:
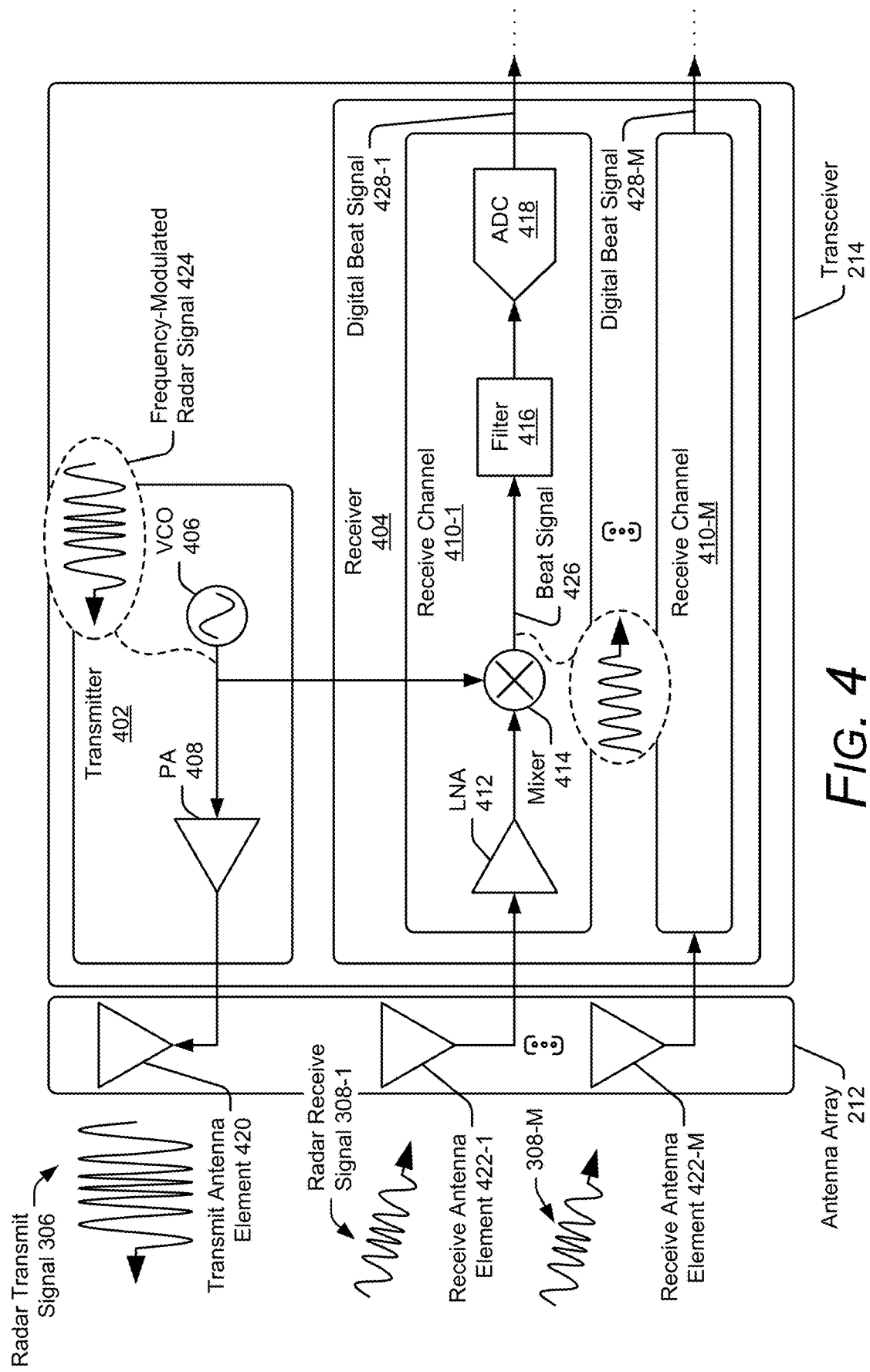
FIG. 4 illustrates an example antenna array and an example transceiver of a radar system.

FIG. 4 illustrates an example antenna array 212 and an example transceiver 214 of the radar system 102. In the depicted configuration, the transceiver 214 includes a transmitter 402 and a receiver 404. The transmitter 402 includes at least one voltage-controlled oscillator 406 and at least one power amplifier 408. The receiver 404 includes at least two receive channels 410-1 to 410-M, where M is a positive integer greater than one. Each receive channel 410-1 to 410-M includes at least one low-noise amplifier 412, at least one mixer 414, at least one filter 416, and at least one analog-to-digital converter 418.

The antenna array 212 includes at least one transmit antenna element 420 and at least two receive antenna elements 422-1 to 422-M. The transmit antenna element 420 is coupled to the transmitter 402. The receive antenna elements 422-1 to 422-M are respectively coupled to the receive channels 410-1 to 410-M. Although the radar system 102 of FIG. 4 is shown to include multiple receive antenna elements 422-1 to 422-M and multiple receive channels 410-1 to 410-M, the described techniques for symmetric Doppler interference mitigation can also be applied to radar systems 102 that utilize a single receive antenna element 422 and a single receive channel 410.

During transmission, the voltage-controlled oscillator 406 generates a frequency-modulated radar signal 424 at radio frequencies. The power amplifier 408 amplifies the frequency-modulated radar signal 424 for transmission via the transmit antenna element 420. The transmitted frequency-modulated radar signal 424 is represented by the radar transmit signal 306, which can include multiple chirps 310-1 to 310-N based on the radar framing structure 312 of FIG. 3-2. As an example, the radar transmit signal 306 is generated according to the burst-mode feature frame 320 of FIG. 3-2 and includes 16 chirps 310 (e.g., N equals 16).

During reception, each receive antenna element 422-1 to 422-M receives a version of the radar receive signal 308-1 to 308-M. In general, relative phase differences between these versions of the radar receive signals 308-1 to 308-M are due to differences in locations of the receive antenna elements 422-1 to 422-M. Within each receive channel 410-1 to 410-M, the low-noise amplifier 412 amplifies the radar receive signal 308, and the mixer 414 mixes the amplified radar receive signal 308 with the frequency-modulated radar signal 424. In particular, the mixer performs a beating operation, which downconverts and demodulates the radar receive signal 308 to generate a beat signal 426.

A frequency of the beat signal 426 represents a frequency difference between the frequency-modulated radar signal 424 and the radar receive signal 308, which is proportional to the slant range 304 of FIG. 3-1. Although not shown, the beat signal 426 can include multiple frequencies, which represents reflections from different portions of the user 302 (e.g., different fingers, different portions of a hand, or different body parts). In some cases, these different portions move at different speeds, move in different directions, or are positioned at different slant ranges relative to the radar system 102.

The filter 416 filters the beat signal 426, and the analog-to-digital converter 418 digitizes the filtered beat signal 426. The receive channels 410-1 to 410-M respectively generate digital beat signals 428-1 to 428-M, which are provided to the system processor 216 for processing. The receive channels 410-1 to 410-M of the transceiver 214 are coupled to the system processor 216, as shown in FIG. 5.

Figure 5:
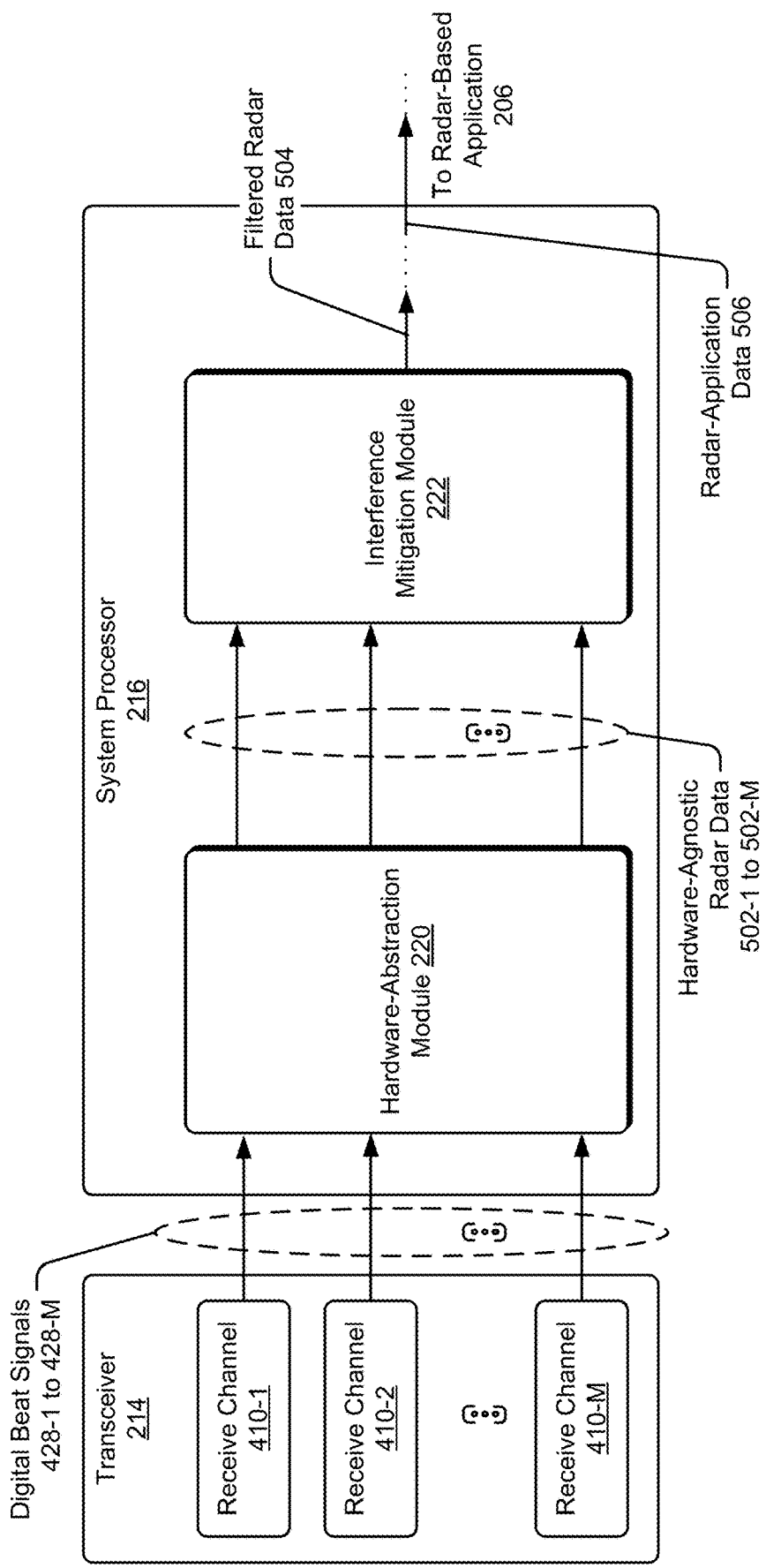
FIG. 5 illustrates an example scheme implemented by a radar system for performing symmetric Doppler interference mitigation.

FIG. 5 illustrates an example scheme implemented by the radar system 102 for performing symmetric Doppler interference mitigation. In the depicted configuration, the system processor 216 implements the hardware-abstraction module 220 and the interference mitigation module 222. The system processor 216 is connected to the receive channels 410-1 to 410-M. The system processor 216 can also communicate with the computer processor 202. Although not shown, the hardware-abstraction module 220 and/or the interference mitigation module 222 can be implemented by the computer processor 202.

In this example, the hardware-abstraction module 220 accepts the digital beat signals 428-1 to 428-M from the receive channels 410-1 to 410-M. The digital beat signals 428-1 to 428-M represent raw or unprocessed complex radar data. The hardware-abstraction module 220 performs one or more operations to generate hardware-agnostic radar data 502-1 to 502-M based on digital beat signals 428-1 to 428-M. The hardware-abstraction module 220 transforms the complex radar data provided by the digital beat signals 428-1 to 428-M into a form that is expected by the interference mitigation module 222. In some cases, the hardware-abstraction module 220 normalizes amplitudes associated with different transmit power levels or transforms the complex radar data into a frequency-domain representation.

The hardware-agnostic radar data 502-1 to 502-M can include magnitude information or both magnitude and phase information (e.g., in-phase and quadrature components). In some implementations, the hardware-agnostic radar data 502-1 to 502-M includes range-Doppler maps for each receive channel 410-1 to 410-M and for a particular active feature frame 316, as further described with respect to FIGS. 6 and 7.

The interference mitigation module 222 generates filtered radar data 504 based on the hardware-agnostic radar data 502-1 to 502-M. As an example, the filtered radar data 504 includes filtered range-Doppler maps with interference artifacts that have been attenuated. The filtered radar data 504 can be provided to other modules within the radar system 102, such as a gesture-recognition module, a presence-detection module, a collision-avoidance module, a vital-sign measurement module, and so forth. These modules produce radar-application data 506, which is provided to the radar-based application 206 of FIG. 2-1. Operation of the hardware-abstraction module 220 is further described with respect to FIG. 6.

Figure 6:
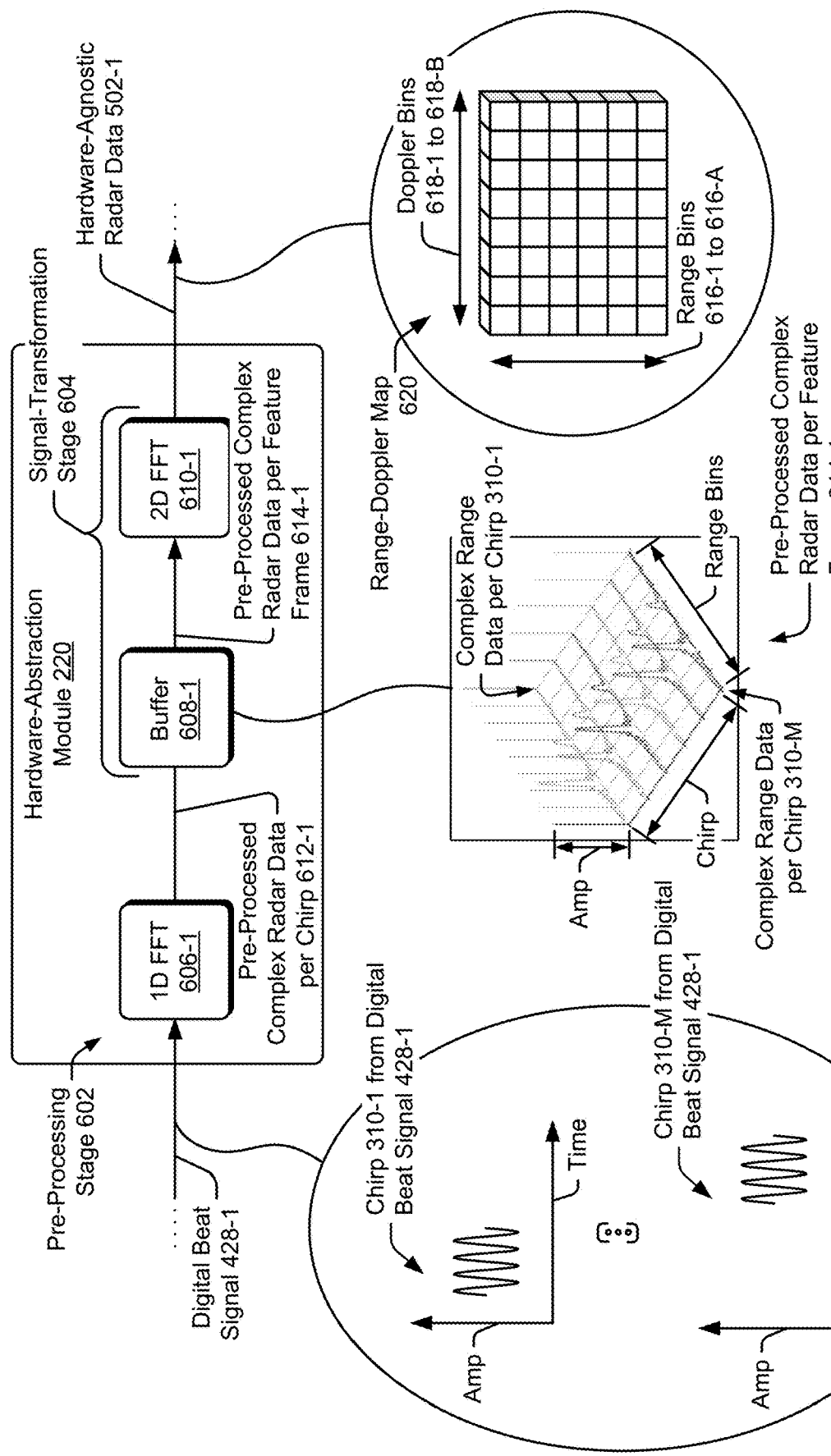
FIG. 6 illustrates an example portion of a hardware-abstraction module for performing symmetric Doppler interference mitigation.

FIG. 6 illustrates an example hardware-abstraction module 220 for performing symmetric Doppler interference mitigation. In the depicted configuration, the hardware-abstraction module 220 includes a pre-processing stage 602 and a signal-transformation stage 604. The pre-processing stage 602 operates on each chirp 310-1 to 310-N within the digital beat signals 428-1 to 428-M. In other words, the pre-processing stage 602 performs an operation for each active radar frame 322. In this example, the pre-processing stage 602 includes M one-dimensional (1D) Fast-Fourier Transform (FFT) modules, which respectively process the digital beat signals 428-1 to 428-M. Other types of modules that perform similar operations are also possible, such as a Fourier Transform module.

For simplicity, the hardware-abstraction module 220 is shown to process a digital beat signal 428-1 associated with the receive channel 410-1. The digital beat signal 428-1 includes the chirps 310-1 to 310-M, which are time-domain signals. The chirps 310-1 to 310-M are passed to a one-dimensional FFT module 606-1 in an order in which they are received and processed by the transceiver 214. Assuming the radar receive signals 308-1 to 308-M include 16 chirps 310-1 to 310-N (e.g., N equals 16), the one-dimensional FFT module 606-1 performs 16 FFT operations to generate pre-processed complex radar data per chirp 612-1.

The signal-transformation stage 604 operates on the sequence of chirps 310-1 to 310-M within each of the digital beat signals 428-1 to 428-M. In other words, the signal-transformation stage 604 performs an operation for each active feature frame 316. In this example, the signal-transformation stage 604 includes M buffers and M two-dimensional (2D) FFT modules. For simplicity, the signal-transformation stage 604 is shown to include a buffer 608-1 and a two-dimensional FFT module 610-1.

The buffer 608-1 stores a first portion of the pre-processed complex radar data 612-1, which is associated with the first chirp 310-1. The one-dimensional FFT module 606-1 continues to process subsequent chirps 310-2 to 310-N, and the buffer 608-1 continues to store the corresponding portions of the pre-processed complex radar data 612-1. This process continues until the buffer 608-1 stores a last portion of the pre-processed complex radar data 612-1, which is associated with the chirp 310-M.

At this point, the buffer 608-1 stores pre-processed complex radar data associated with a particular feature frame 614-1. The pre-processed complex radar data per feature frame 614-1 represents magnitude information (as shown) and phase information (not shown) across different chirps 310-1 to 310-N and across different range bins 616-1 to 616-A, where A represents a positive integer.

The two-dimensional FFT 610-1 accepts the pre-processed complex radar data per feature frame 614-1 and performs a two-dimensional FFT operation to form the hardware-agnostic radar data 502-1, which represents a range-Doppler map 620. The range-Doppler map 620 includes complex radar data for the range bins 616-1 to 616-A and Doppler bins 618-1 to 618-B, where B represents a positive integer. In other words, each range bin 616-1 to 616-A and Doppler bin 618-1 to 618-B includes a complex number with real and imaginary parts that together represent magnitude and phase information. The quantity of range bins 616-1 to 616-A can be on the order of tens or hundreds, such as 64 or 128 (e.g., A equals 64 or 128). The quantity of Doppler bins can be on the order of tens or hundreds, such as 32, 64, or 124 (e.g., B equals 32, 64, or 124). As described above with respect to FIGS. 1 and 3-1, the range-Doppler map 620 can include an interference artifact, as further described with respect to FIG. 7.

Figure 7:
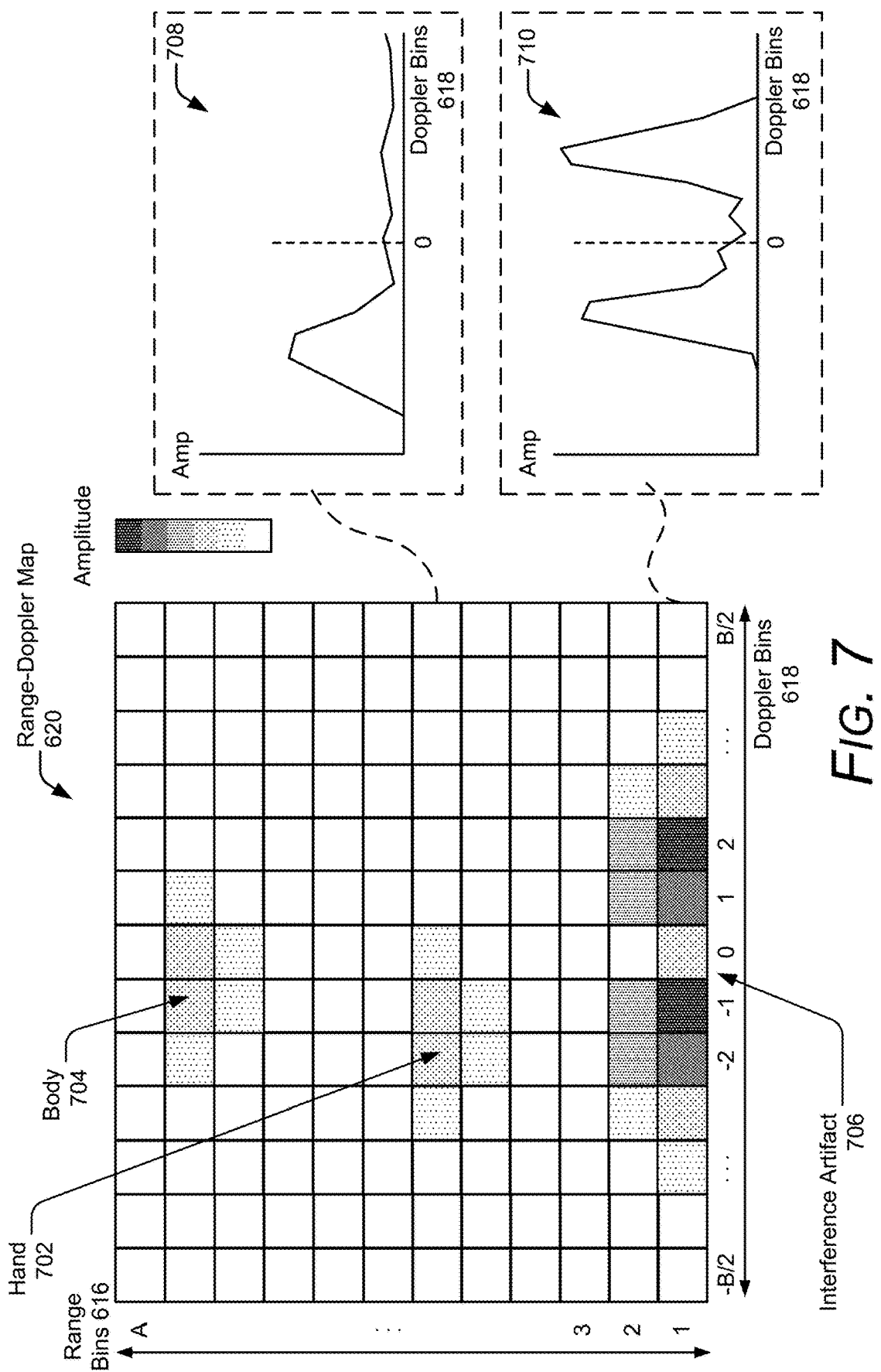
FIG. 7 illustrates an example range-Doppler map for performing symmetric Doppler interference mitigation.

FIG. 7 illustrates an example range-Doppler map 620 for performing symmetric Doppler interference mitigation. In this example, the amplitude (or magnitude) information of the hardware-agnostic radar data 502 is illustrated with different patterns. Larger amplitudes are represented with patterns that have a larger percentage of black. Smaller amplitudes are represented with patterns that have a smaller percentage of black (e.g., a higher percentage of white). Although not shown, the range-Doppler map 620 can also include phase information.

Each range bin 616 and Doppler bin 618 contains amplitude information for a particular range interval and Doppler frequency interval. The range bins 616 are labeled from 1 to A. The Doppler bins 618 are labeled from −B/2 to 0 to B/2. The zero Doppler bin 618 includes amplitude information for objects that have a Doppler frequency of 0 Hz or a Doppler frequency equal to a multiple of the pulse repetition frequency (PRF). The ±B/2 bins include amplitude information for objects that have a Doppler frequency of ±PRF/2.

In this example, the radar receive signal 308 includes reflections from a hand 702 of the user 302 (of FIG. 3) and reflections from a body 704 of the user 302. The hand 702 and the body 704 have a medium-low amplitudes at different range bins 616. In this case, the body 704 is relatively stationary and appears within the zero and negative one Doppler bins 618. The hand 702 appears within the negative two and negative one Doppler bins 618. In most situations, the desired object (or user 302) contributes to amplitudes within a few Doppler bins 618 that are either on the positive side or the negative side of the Doppler spectrum. As such, a plot of the amplitude of the object is one-sided and not symmetrical across the Doppler bins 618 for the range bin 616 corresponding to the slant range 304 to the object. For example, at 708, the amplitude response of one of the range bins that includes the hand 702 has a single peak within the negative Doppler bins 618 and no peak within the positive Doppler bins 618.

The radar receive signal 308 also includes an interference artifact 706 due to vibration of the radar system 102, vibration of a component within the smart device 104, or vibration of an object within the external environment. Due to the back and forth motion of the vibration, the interference artifact 706 contributes to amplitudes of both positive and negative Doppler bins, such as the negative two and positive two Doppler bins 618. An amplitude of the interference artifact 706 is also approximately symmetric for one or more range bins 616. An example amplitude plot of the interference artifact 706 for the first range bin 616 is shown at 710. Note that an amplitude of the interference artifact 706 is greater than an amplitude of the hand 702 in this example.

As shown at 710, the amplitude of the interference artifact 706 is approximately symmetric across the Doppler bins 618. In other words, a peak at one of the positive Doppler bins 618 corresponds, or essentially corresponds, to another peak at one of the negative Doppler bins 618. In this example, a peak occurs at the positive two Doppler bin 618 and a corresponding peak, or essentially corresponding peak, occurs at the negative one Doppler bin 618. As described, the corresponding positive and negative Doppler bins 618 do not have to be exactly the same (e.g., the highest part of the peaks do not have to occur within the positive two and negative two Doppler bins 618 or the positive one and negative one Doppler bins 618). Instead, the corresponding positive and negative Doppler bins 618 can be within some window depending on the resolution of the Doppler bins 618 (e.g., within two Doppler bins 618 of the opposite Doppler bin 618, within three Doppler bins 618 of the opposite Doppler bin 618, and so forth). This interval can include a quantity of Doppler bins 618 that represent a fraction of the pulse-repetition frequency, such as less than ten percent or less than twenty percent, for example. In some cases, the amplitudes of these peaks are approximately equal to each other (e.g., within ten to twenty percent of each other or less).

In another example not shown, the amplitude of the interference artifact 706 is symmetric across the Doppler bins 618. In other words, a peak occurs at one of the positive Doppler bins 618 (e.g., the positive one Doppler bin 618) and another peak occurs at a corresponding negative Doppler bin 618 (e.g., the negative one Doppler bin 618).

In other examples not shown, the interference artifact 706 can contribute to the amplitudes of all of the Doppler bins 618. Sometimes, some frequency components of the interference artifact 706 that are greater than half of the pulse repetition frequency experience aliasing. As an example, the pulse repetition frequency of the radar system 102 can be approximately two kilohertz. In this case, a portion of the interference artifact 706 can wrap around the Doppler spectrum and encompass both the ±B/2 Doppler bins 618 and ±1 Doppler bins 618. In some cases, the interference artifact 706 is observed across multiple range bins 616. The quantity of range bins 616 depends on the range bin resolution and interactions between the radar signals and an interior of the smart device 104. As an example, the interference artifact 706 can space across multiple range bins 616 that represent a range that is less than or equal to 25 centimeters (cm).

Figures 1, 8:
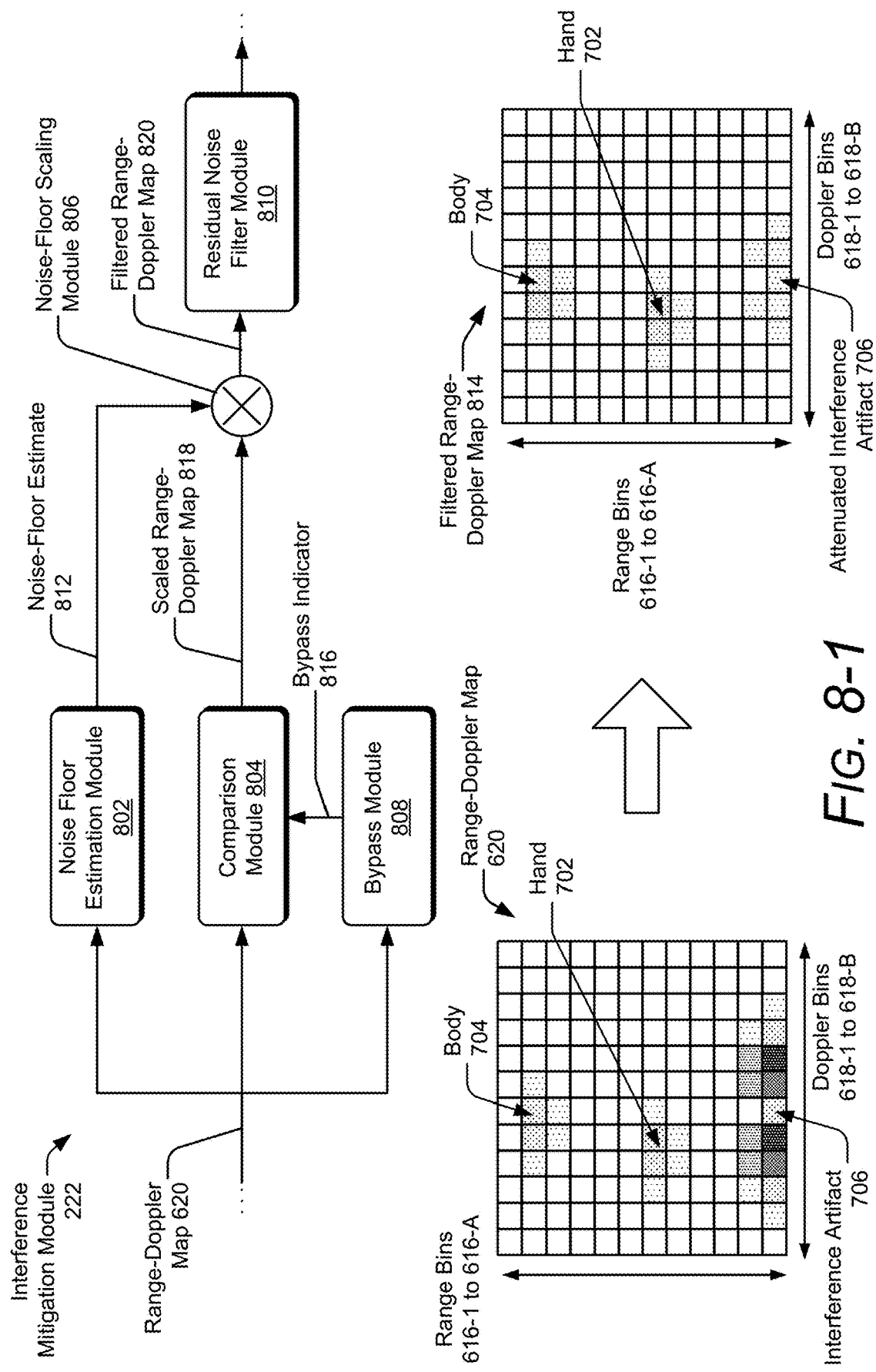
Figures 2, 8:
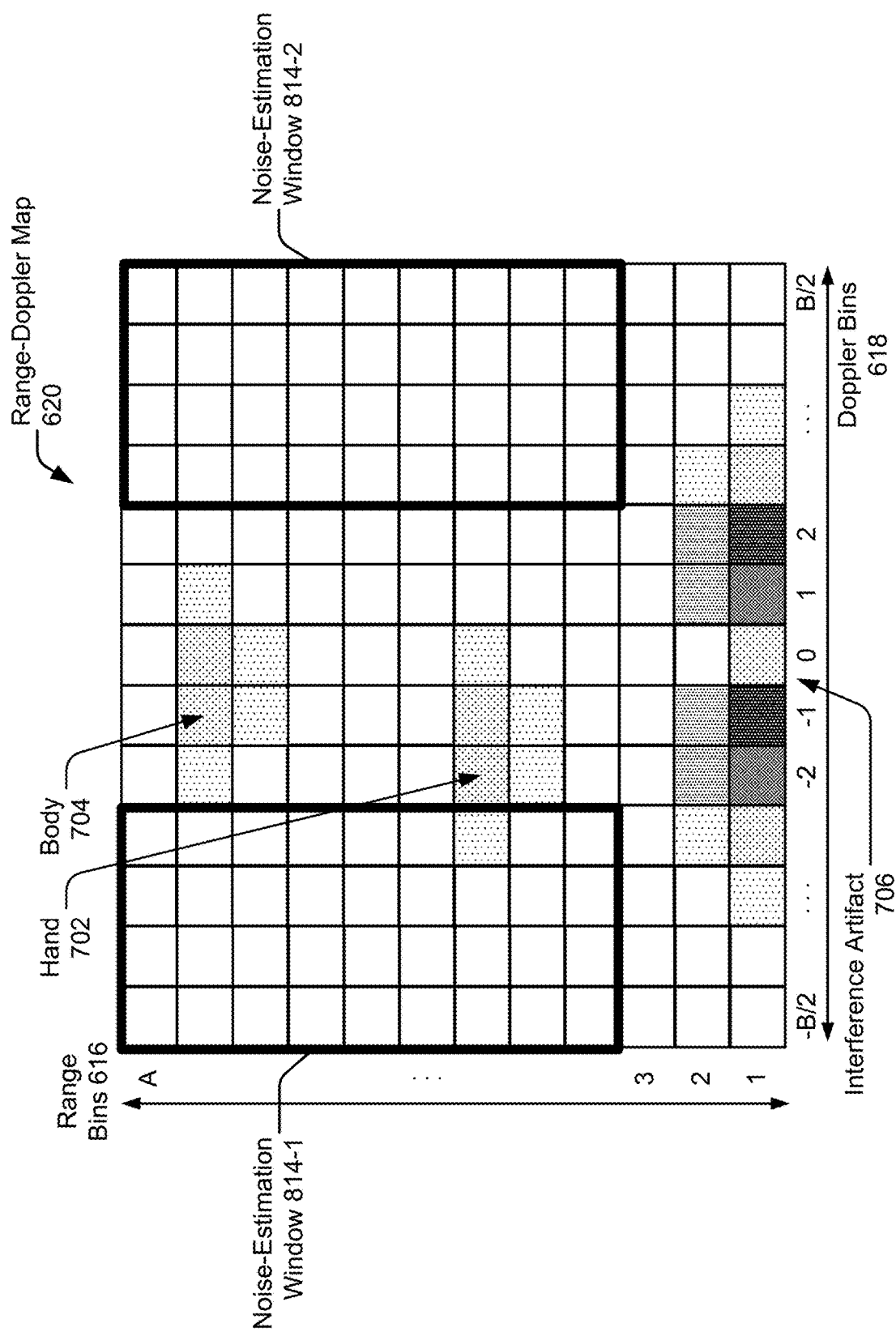

The interference mitigation module 222 exploits the symmetric amplitude of the interference artifact 706 across the Doppler bins 618 to attenuate the interference artifact 706 without significantly attenuating desired objects, such as the hand 702 or the body 704, as further described with respect to FIG. 8-1.

FIG. 8-1 illustrates an example implementation of a interference mitigation module 222 for symmetric Doppler interference mitigation. In the example, the interference mitigation module 222 includes a noise floor estimation module 802, a comparison module 804, and a noise-floor scaling module 806. The interference mitigation module 222 can optionally include a bypass module 808 and a residual noise filter module 810 to further improve symmetric Doppler interference mitigation.

During operation, the interference mitigation module 222 receives at least one range-Doppler map 620, such as the range-Doppler map 620 of FIG. 7. Although not shown, the interference mitigation module 222 can sequentially or concurrently process multiple range-Doppler maps 620, such as those that correspond to the different receive channels 410-1 to 410-M. Similar operations that are described with respect to the range-Doppler map 620 are applied to the remaining range-Doppler maps 620.

During operation, the noise floor estimation module 802 analyzes the range-Doppler map 620 to produce a noise-floor estimate 812. In some cases, the noise floor estimation module 802 determines the noise-floor estimate 812 based on a particular set of range bins 616 and Doppler bins 618. These range bins 616 and Doppler bins 618 can exclude those that are likely to be affected by the interference artifact 706 or other stationary objects.

Consider FIG. 8-2, which illustrates example regions within the range-Doppler map 620 (of FIG. 7) for estimating a noise level. In particular, a first noise-estimation window 814-1 and a second noise-estimation window 814-2 identify range bins 616 and Doppler bins 618 for generating the noise-floor estimate 812. In this case, the noise-estimation windows 814-1 and 814-2 do not include the Doppler bins 618 associated with stationary objects or objects with range rates that appear in the low Doppler bins 618 (e.g., the 0 and ±1 Doppler bins 618). Additionally, the noise-estimation windows 814-1 to 814-2 avoid a first few range bins 616 in which the interference artifact 706 may be present. As an example, the noise-estimation windows 814-1 to 814-2 do not include range bins 616 that represent slant ranges 304 that are less than 25 cm.

In some cases, one or more of the noise-estimation windows 814-1 or 814-2 include a bin associated with one or more desired objects. However, due to the large number of bins that are not associated with a desired object, inclusion of a desired object, such as the hand 702 within the noise-estimation window 814-1, does not significantly impact the noise-floor estimate 812.

The noise floor estimation module 802 computes an average amplitude of the bins within the noise-estimation windows 814-1 and 814-2 to determine the noise-floor estimate 812. In other cases, the noise floor estimation module 802 computes a noise-floor estimate 812 for each bin by computing a local average (e.g., averaging the amplitude of each bin with its neighboring bins).

Returning to FIG. 8-1, the bypass module 808 analyzes the range-Doppler map 620 to determine whether or not a desired object contributes to a peak at the zero Doppler bin 618 or the neighboring ±1 Doppler bins 618. If a desired object is detected, the bypass module 808 provides a bypass indicator 816 to the comparison module 804, which directs the comparison module 804 to not filter the low Doppler bins 618, such as the ±1 Doppler bins 618. Alternatively, if the bypass module 808 determines that there is not a desired object within the low Doppler bins 618, the bypass indicator 816 directs the comparison module 804 to filter the low Doppler bins 618.

The bypass module 808 makes this determination by analyzing a shape of a peak within the zero and ±1 Doppler bins 618. If the bypass module 808 detects a single peak within these bins, the bypass module 808 determines that a desired object is present. Alternatively, if the bypass module 808 detects two peaks across any of these bins, the bypass module 808 determines that a desired object is not present. If a desired object is not present, the comparison module 804 applies a filter that attenuates the detected peaks. Otherwise, if a desired object is present, the comparison module 804 does not apply the filter.

The comparison module 804 compares amplitudes of the positive Doppler bins 618 to amplitudes of the corresponding negative Doppler bins 618 for each range bin 616. In one example, the comparison module 804 scales an amplitude of a first positive Doppler bin 618 (e.g., the positive one Doppler bin) by an amplitude of the corresponding first negative Doppler bin 618 (e.g., the negative one Doppler bin). This process continues for other Doppler bins 618 such that the amplitudes of the positive two, three . . . B/2 Doppler bins 618 are scaled by amplitudes of the corresponding negative two, negative three . . . −B/2 Doppler bins 618.

Amplitudes of the negative Doppler bins 618 are similarly adjusted. For example, the first negative Doppler bin 618 (e.g., negative one Doppler bin) is scaled by the original amplitude of the first positive Doppler bin 618 (e.g., the positive one Doppler bin). Note that if the bypass indicator 816 indicates that a desired object is present within the low Doppler bins 618 (e.g., the zero Doppler bin, the positive one Doppler bin, and the negative one Doppler bin), the comparison module 804 does not adjust the amplitude of these bins 618.

This filtering operation is further characterized by Equations 1 and 2, which computes the scaled amplitudes of a positive Doppler bin or a negative Doppler bin:

$$\hat{A}_p[x] = \frac{A_p[x]}{A_n[x]} \qquad \text{Equation 1}$$

$$\hat{A}_n[x] = \frac{A_n[x]}{A_p[x]} \qquad \text{Equation 1}$$

where $\hat{A}_p[x]$ represents the scaled amplitude of a positive "x" Doppler bin, $\hat{A}_n[x]$ represents the scaled amplitude of a negative "x" Doppler bin, $A_p[x]$ represents the original amplitude of the positive "x" Doppler bin, and $A_n[x]$ represents the original amplitude of the negative "x" Doppler bin.

Other operations can alternatively be performed by the comparison module 804. For example, the comparison module 804 can perform a subtraction operation to determine the difference in amplitudes between the corresponding Doppler bins 618. In this case, the comparison module 804 decreases an amplitude of the positive one Doppler bin 618 by the amplitude of the negative one Doppler bin 618, and similarly decreases the amplitude of the negative one Doppler bin 618 by the original amplitude of the positive one Doppler bin 618.

In general, the operation performed by the comparison module 804 exploits the symmetric property of the interference artifact 706 to attenuate the interference artifact 706 and produce the scaled range-Doppler map 818. Because the desired object (e.g., the hand 702 or the body 704) is not symmetric across the Doppler spectrum, the amplitude of the desired object is scaled by a value that is representative of the noise floor. Because this value is significantly smaller than the peak amplitude of the interference artifact, the scaled amplitude of the interference artifact 706 can become smaller than the scaled amplitude of the desired object within the scaled range-Doppler map 818.

To reduce the scaling of the desired object, the noise-floor scaling module 806 multiplies the scaled range-Doppler map 818 by the noise-floor estimate 812. This causes the Doppler bins 618 associated with the interference artifact 706 to have amplitudes that are approximately equal to the noise floor. The amplitudes associated with the body 704 or the hand 702, however, remain relatively unchanged as the noise floor estimate 812 is approximately equal to the value by which the comparison module 804 scaled the desired object. The resulting output of the noise-floor scaling module 806 is a filtered range-Doppler map 820.

In some implementations, the residual noise filter module 810 can further process the filtered range-Doppler map 820 to remove noise that results due to the operations performed by the comparison module 804 and the noise-floor scaling module 806. This can include providing a filter that smooths the amplitudes across the range bins 616 and/or Doppler bins 618. The residual noise filter module 810 can be implemented as a low-pass filter, a median filter, a filter that operates across one dimension (e.g., operates on the range bins 616 or the Doppler bins 618), a filter that operates on two dimensions (e.g., operates on both the range bins 616 and the Doppler bins 618), or some combination thereof.

The interference mitigation module 222 is also not limited to only analyzing and adjusting the amplitude of the range-Doppler map 620. In some implementations, the interference mitigation module 222 additionally operates on the phase information within the range-Doppler map 620. Consider an example in which the interference artifact 706 causes the phases of the positive Doppler bins and phases of the negative Doppler bins to be in-phase or out of phase. In this case, the interference mitigation module 222 can recognize this characteristic to determine whether or not the interference artifact 706 is present. If the interference artifact 706 is present, the interference mitigation module 222 activates the comparison module 804 to filter the interference artifact 706. Otherwise, the filtering operation is bypassed so that the system processor 216 operates on the range-Doppler map 620 instead of the filtered range-Doppler map 820. In some cases, the interference mitigation module 222 can analyze the phase information to determine an amount to suppress the interference artifact 706.

In some cases, the interference mitigation module 222 operates on a portion of the range bins 616. If the interference artifact 706 is likely to appear within a particular set of range bins 616, for instance, the interference mitigation module 222 can perform the actions described above for this set of range bins 616 and not process the remaining range bins 616. As an example, the set of range bins 616 can include the first five range bins 616, the first seven range bins 616, or the first ten range bins 616. This can increase efficiency of the interference mitigation module 222 and enable the interference mitigation module 222 to operate on range-Doppler maps 620 that have a large quantity of range bins 616 and/or Doppler bins 618.

Example Method

Figure 9:
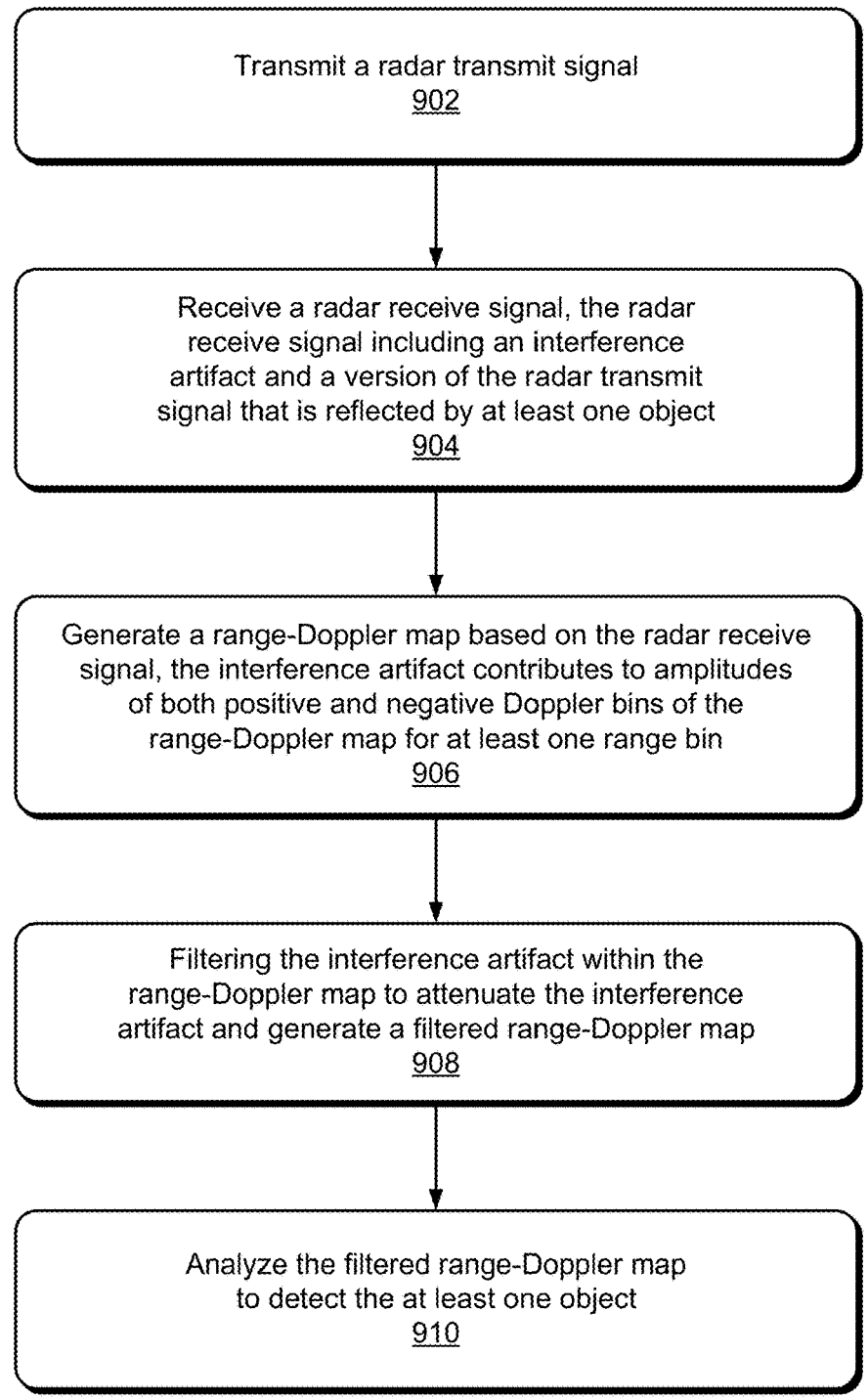
FIG. 9 illustrates an example method of a radar system for performing symmetric Doppler interference mitigation.

FIG. 9 depicts an example method 900 for performing operations of a smart-device-based radar system capable of symmetric Doppler interference mitigation. Method 900 is shown as sets of operations (or acts) performed but not necessarily limited to the order or combinations in which the operations are shown herein. Further, any of one or more of the operations may be repeated, combined, reorganized, or linked to provide a wide array of additional and/or alternate methods. In portions of the following discussion, reference may be made to the environment 100-1 to 100-4 of FIG. 1, and entities detailed in FIG. 2-1 or 8-1, reference to which is made for example only. The techniques are not limited to performance by one entity or multiple entities operating on one device.

At 902, a radar transmit signal is transmitted. For example, the radar system 102 uses at least one transmit antenna element 420 to transmit the radar transmit signal 306, as shown in FIG. 4. In some implementations, the radar transmit signal 306 includes multiple chirps 310-1 to 310-N, whose frequencies are modulated, as shown in FIG. 3.

At 904, a radar receive signal is received. The radar receive signal includes an interference artifact and a version of the radar transmit signal that is reflected by at least one object. For example, the radar system 102 uses at least one receive antenna element 422 to receive a version of the radar receive signal 308 that is reflected by the user 302, as shown in FIGS. 3-1 and 4. The radar receive signal 308 can also include the interference artifact 706 shown in FIG. 7. The interference artifact 706 can occur due to vibration of the radar system 102 or vibration of other objects detected by the radar system 102.

At 906, a range-Doppler map is generated based on the radar receive signal. The interference artifact contributes to amplitudes of both positive and negative Doppler bins of the range-Doppler map for at least one range bin. For example, the hardware-abstraction module 220 generates the range-Doppler map 620, as shown in FIG. 6. Across at least one range bin 616 within the range-Doppler map 620 (e.g., such as the first range bin 616), the interference artifact 706 contributes to amplitudes of both positive and negative Doppler bins 618, such as the $\pm 1$, $\pm 2$, and $\pm 3$ Doppler bins 618. In particular, the interference artifact 706 has an approximately symmetric amplitude across the Doppler bins 618, as shown at 710.

At 908 the interference artifact within the range-Doppler map is filtered to attenuate the interference artifact and generate a filtered range-Doppler map. For example, the interference mitigation module 222 filters the range-Doppler map 620 to attenuate the interference artifact 706 and generate the filtered range-Doppler map 818, as shown in FIG. 8-1.

At 910, the filtered range-Doppler map is analyzed to detect the at least one object. For example, the system processor 216 analyzes the filtered range-Doppler map 818 to detect the at least one object. The system processor 216 can further determine one or more characteristics about the object, such as the object's relative position (e.g., range, azimuth and/or elevation), movement, or composition. The system processor 216 can also recognize a gesture performed by a user, measure a vital-sign of the user, provide collision avoidance, and so forth.

Example Computing System

Figure 10:
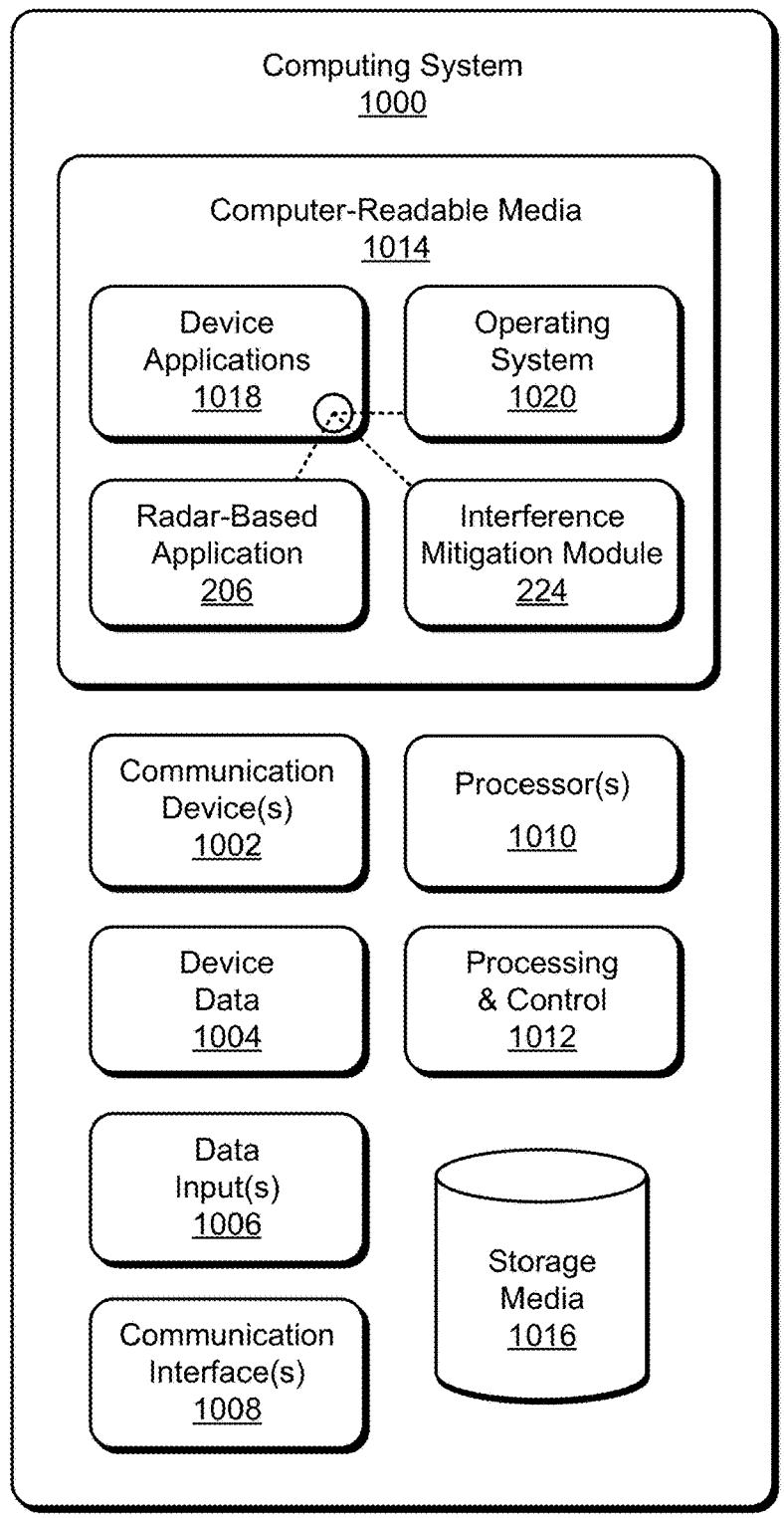
FIG. 10 illustrates an example computing system embodying, or in which techniques may be implemented that enable use of, a radar system capable of performing symmetric Doppler interference mitigation.

FIG. 10 illustrates various components of an example computing system 1000 that can be implemented as any type of client, server, and/or computing device as described with reference to the previous FIG. 2-1 to implement symmetric Doppler interference mitigation.

The computing system 1000 includes communication devices 1002 that enable wired and/or wireless communication of device data 1004 (e.g., received data, data that is being received, data scheduled for broadcast, or data packets of the data). Although not shown, the communication devices 1002 or the computing system 1000 can include one or more radar systems 102. The device data 1004 or other device content can include configuration settings of the device, media content stored on the device, and/or information associated with a user 302 of the device. Media content stored on the computing system 1000 can include any type of audio, video, and/or image data. The computing system 1000 includes one or more data inputs 1006 via which any type of data, media content, and/or inputs can be received, such as human utterances, the radar-based application 206, user-selectable inputs (explicit or implicit), messages, music, television media content, recorded video content, and any other type of audio, video, and/or image data received from any content and/or data source.

The computing system 1000 also includes communication interfaces 1008, which can be implemented as any one or more of a serial and/or parallel interface, a wireless interface, any type of network interface, a modem, and as any other type of communication interface. The communication interfaces 1008 provide a connection and/or communication links between the computing system 1000 and a communication network by which other electronic, computing, and communication devices communicate data with the computing system 1000.

The computing system 1000 includes one or more processors 1010 (e.g., any of microprocessors, controllers, and the like), which process various computer-executable instructions to control the operation of the computing system 1000 and to enable techniques for, or in which can be embodied, gesture recognition in the presence of saturation. Alternatively or in addition, the computing system 1000 can be implemented with any one or combination of hardware, firmware, or fixed logic circuitry that is implemented in connection with processing and control circuits which are generally identified at 1012. Although not shown, the computing system 1000 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The computing system 1000 also includes a computer-readable media 1014, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. The disk storage device may be implemented as any type of magnetic or optical storage device, such as a hard disk drive, a recordable and/or rewriteable compact disc (CD), any type of a digital versatile disc (DVD), and the like. The computing system 1000 can also include a mass storage media device (storage media) 1016.

The computer-readable media 1014 provides data storage mechanisms to store the device data 1004, as well as various device applications 1018 and any other types of information and/or data related to operational aspects of the computing system 1000. For example, an operating system 1020 can be maintained as a computer application with the computer-readable media 1014 and executed on the processors 1010. The device applications 1018 may include a device manager, such as any form of a control application, software application, signal-processing and control module, code that is native to a particular device, a hardware abstraction layer for a particular device, and so on.

The device applications 1018 also include any system components, engines, or managers to implement symmetric Doppler interference mitigation. In this example, the device applications 1018 includes the radar-based application 206 and the interference mitigation module 224 of FIG. 2-1.

CONCLUSION

Although techniques using, and apparatuses including, a smart-device-based radar system performing symmetric Doppler interference mitigation have been described in language specific to features and/or methods, it is to be understood that the subject of the appended claims is not necessarily limited to the specific features or methods described. Rather, the specific features and methods are disclosed as example implementations of a smart-device-based radar system performing symmetric Doppler interference mitigation.

Some examples are described below.

Example 1: A method performed by a radar system, the method comprising:

transmitting a radar transmit signal using an antenna array of the radar system;

receiving a radar receive signal using the antenna array, the radar receive signal including an interference artifact and a version of the radar transmit signal that is reflected by at least one object;

generating a range-Doppler map based on the radar receive signal, the interference artifact contributing to amplitudes of both positive and negative Doppler bins of the range-Doppler map for at least one range bin;

filtering the interference artifact within the range-Doppler map to attenuate the interference artifact and generate a filtered range-Doppler map; and analyzing the filtered range-Doppler map to detect the at least one object.

Example 2: The method of example 1, wherein the amplitudes associated with the interference artifact are approximately symmetric across the positive and negative Doppler bins for the at least one range bin.

Example 3: The method of example 2, wherein:

the amplitude associated with the interference artifact are approximately symmetric such that a first amplitude peak within a first positive Doppler bin of the positive Doppler bins corresponds to a second amplitude peak within a first negative Doppler bin of the negative Doppler bins;

the first amplitude peak and the second amplitude peak occur within the at least one range bin;

the first amplitude peak is within twenty percent of the second amplitude peak; and the first negative Doppler bin is within at least two Doppler bins of a negative Doppler bin that corresponds to the first positive Doppler bin.

Example 4: The method of any preceding example, wherein:

the at least one object contributes to amplitudes of one or more of the positive Doppler bins or one or more of the negative Doppler bins for at least one other range bin; and the filtering of the interference artifact results in the positive and negative Doppler bins affected by the interference artifact having a peak amplitude that is smaller than a peak amplitude of either the one or more positive Doppler bins or the one or more negative Doppler bins associated with the at least one object for the at least one other range bin.

Example 5: The method of any preceding example, wherein the interference artifact represents vibration of the radar system during at least a portion of time that the radar receive signal is received.

Example 6: The method of any preceding example, wherein:
the radar system is embedded within a smart device;
the smart device includes a first component; and
the interference artifact represents at least one of the following:
vibration of the at least one first component; or
vibration of another object that is external to the smart device.

Example 7: The method of any preceding example, wherein the filtering of the interference artifact within the range-Doppler map comprises:
producing a scaled range-Doppler map by:
scaling amplitudes of the positive Doppler bins by amplitudes of corresponding negative Doppler bins for each range bin of the range-Doppler map; and
scaling amplitudes of the negative Doppler bins by the amplitudes of the corresponding positive Doppler bins for each range bin of the range-Doppler map.

Example 8: The method of example 7, wherein the filtering of the interference artifact comprises:
estimating a noise floor of the range-Doppler map; and
multiplying the scaled range-Doppler map by the estimated noise floor to generate the filtered range-Doppler map.

Example 9: The method of example 8, wherein the filtering of the interference artifact comprises applying a medium filter to the filtered range-Doppler map, the medium filter comprising at least one one-dimensional filter or at least one two-dimensional filter.

Example 10: The method of example 7, wherein:
the filtering of the interference artifact comprises detecting that at least one other object contributes to amplitudes of low Doppler bins within the range-Doppler map, the low Doppler bins including at least a zero Doppler bin and both a positive Doppler bin and a negative Doppler bin that are next to the zero Doppler bin; and
the scaling the amplitudes of the positive Doppler bins and the scaling the amplitudes of the negative Doppler bins comprises, responsive to detecting the at least one other object, scaling the amplitudes of Doppler bins that do not include the low Doppler bins.

Example 11: The method of any preceding example, wherein:
the receiving of the radar receive signal comprises receiving multiple versions of the radar receive signal using different antenna elements of the radar system;
the generating the range-Doppler map comprises generating multiple range-Doppler maps that represent the multiple versions of the radar receive signal; and
the filtering of the interference artifact comprises filtering the interference artifact within the multiple range-Doppler maps.

Example 12: The method of any preceding example, wherein the at least one object comprises a user, the method further comprising:
recognizing a gesture performed by the user by analyzing the filtered range-Doppler map; or
measuring a vital sign of the user by analyzing the filtered range-Doppler map.

Example 13: The method of any of examples 1 to 11, wherein the at least one object comprises a stylus,
the method further comprising recognizing a gesture performed by a user using the stylus.

Example 14: An apparatus comprising:
a radar system comprising:
an antenna array;
a transceiver; and
a processor and computer-readable storage media configured to perform any of the methods of examples 1 to 13.

Example 15: The apparatus of example 14, wherein the apparatus comprises a smart device, the smart device comprising one of the following:
a smartphone;
a smart watch;
a smart speaker;
a smart thermostat;
a security camera;
a vehicle; or
a household appliance.

The invention claimed is:

1. A method performed by a radar system embedded within a smart device, the method comprising:
transmitting a radar transmit signal;
receiving a radar receive signal, the radar receive signal including a portion of the radar transmit signal that is reflected by at least one object and an interference artifact representing another portion of the radar transmit signal that is reflected by a component within the smart device, the interference artifact representing at least vibration of the component;
generating first information representative of a range-Doppler map based on the radar receive signal, the interference artifact contributing to amplitudes of both positive and negative Doppler bins of the range-Doppler map for at least one range bin;
filtering the interference artifact within the first information to attenuate the interference artifact and generate second information representative of a filtered range-Doppler map; and
analyzing the second information to detect the at least one object.

2. The method of claim 1, wherein the amplitudes associated with the interference artifact are approximately symmetric across the positive and negative Doppler bins for the at least one range bin.

3. The method of claim 2, wherein:
the amplitudes associated with the interference artifact are approximately symmetric such that a first amplitude peak within a first positive Doppler bin of the positive Doppler bins corresponds to a second amplitude peak within a first negative Doppler bin of the negative Doppler bins;
the first amplitude peak and the second amplitude peak occur within the at least one range bin;
the first amplitude peak is within twenty percent of the second amplitude peak; and
the first negative Doppler bin is within at least two Doppler bins of a negative Doppler bin that corresponds to the first positive Doppler bin.

4. The method of claim 1, wherein:
the at least one object contributes to amplitudes of one or more of the positive Doppler bins or one or more of the negative Doppler bins for at least one other range bin; and the filtering of the interference artifact results in the positive and negative Doppler bins affected by the interference artifact having a peak amplitude that is smaller than a peak amplitude of either the one or more positive Doppler bins or the one or more negative Doppler bins associated with the at least one object for the at least one other range bin.

5. The method of claim 1, wherein the interference artifact represents vibration of the radar system during at least a portion of time that the radar receive signal is received.

6. The method of claim 1, wherein:
the interference artifact further represents at least one of the following:
vibration of the radar system caused by an operation of the component;
vibration of the component; or
vibration of another object that is external to the smart device.

7. The method of claim 1, wherein the filtering of the interference artifact within the first information comprises:
producing third information representative of a scaled range-Doppler map by:
scaling amplitudes of the positive Doppler bins by amplitudes of corresponding negative Doppler bins for each range bin of the range-Doppler map; and
scaling amplitudes of the negative Doppler bins by the amplitudes of the corresponding positive Doppler bins for each range bin of the range-Doppler map.

8. The method of claim 7, wherein the filtering of the interference artifact comprises:
estimating a noise floor of the first information representative of the range-Doppler map; and
multiplying the third information representative of the scaled range-Doppler map by the estimated noise floor to generate the second information representative of the filtered range-Doppler map.

9. The method of claim 8, wherein the filtering of the interference artifact comprises applying a medium filter to the second information representative of the filtered range-Doppler map, the medium filter comprising at least one one-dimensional filter or at least one two-dimensional filter.

10. The method of claim 7, wherein:
the filtering of the interference artifact comprises detecting that at least one other object contributes to amplitudes of low Doppler bins within the range-Doppler map, the low Doppler bins including at least a zero Doppler bin and both a positive Doppler bin and a negative Doppler bin that are next to the zero Doppler bin; and
the scaling the amplitudes of the positive Doppler bins and the scaling the amplitudes of the negative Doppler bins comprises, responsive to detecting the at least one other object, scaling the amplitudes of Doppler bins that do not include the low Doppler bins.

11. The method of claim 1, wherein:
the receiving of the radar receive signal comprises receiving multiple versions of the radar receive signal using different antenna elements of the radar system; and
the first information represents multiple range-Doppler maps respectively associated with the multiple versions of the radar receive signal.

12. The method of claim 1, wherein the at least one object comprises a user, the method further comprising:
recognizing a gesture performed by the user by analyzing the second information; or
measuring a vital sign of the user by analyzing the second information.

13. The method of claim 1, wherein the at least one object comprises a stylus, the method further comprising recognizing a gesture performed by a user using the stylus.

14. An apparatus comprising:
a component; and
a radar system configured to:
transmit a radar transmit signal;
receive a radar receive signal, the radar receive signal including a portion of the radar transmit signal that is reflected by at least one object and an interference artifact representing another portion of the radar transmit signal that is reflected by the component, the interference artifact representing at least vibration of the component;
generate first information representative of a range-Doppler map based on the radar receive signal, the interference artifact contributing to amplitudes of both positive and negative Doppler bins of the range-Doppler map for at least one range bin;
filter the interference artifact within the first information to attenuate the interference artifact and generate second information representative of a filtered range-Doppler map; and
analyze the second information to detect the at least one object.

15. The apparatus of claim 14, wherein the amplitudes associated with the interference artifact are approximately symmetric across the positive and negative Doppler bins for the at least one range bin.

16. The apparatus of claim 15, wherein:
the amplitude associated with the interference artifact are approximately symmetric such that a first amplitude peak within a first positive Doppler bin of the positive Doppler bins corresponds to a second amplitude peak within a first negative Doppler bin of the negative Doppler bins;
the first amplitude peak and the second amplitude peak occur within the at least one range bin;
the first amplitude peak is within twenty percent of the second amplitude peak; and
the first negative Doppler bin is within at least two Doppler bins of a negative Doppler bin that corresponds to the first positive Doppler bin.

17. The apparatus of claim 14, wherein:
the at least one object contributes to amplitudes of one or more of the positive Doppler bins or one or more of the negative Doppler bins for at least one other range bin; and
the radar system is configured to filter the interference artifact such that the positive and negative Doppler bins affected by the interference artifact have a peak amplitude that is smaller than a peak amplitude of either the one or more positive Doppler bins or the one or more negative Doppler bins associated with the at least one object for the at least one other range bin.

18. The apparatus of claim 14, wherein the interference artifact represents vibration of the radar system during at least a portion of time that the radar receive signal is received.

19. The apparatus of claim 14, wherein the interference artifact further represents at least one of the following:
vibration of the radar system caused by an operation of the component;
vibration of the component; or
vibration of another object that is external to the apparatus.

20. The apparatus of claim 14, wherein the apparatus comprises a smart device, the smart device comprising one of the following:
- a smartphone;
- a smart watch;
- a smart speaker;
- a smart thermostat;
- a security camera;
- a vehicle; or
- a household appliance.

* * * * *